United States Patent [19]

Clark, Jr. et al.

[11] 3,789,360

[45] Jan. 29, 1974

[54] CONVOLUTIONAL DECODER

[75] Inventors: George Cyril Clark, Jr., Indialantic; Robert Curtis Davis, Melbourne Beach, both of Fla.

[73] Assignee: Harris-Intertype Corporation, Cleveland, Ohio

[22] Filed: Oct. 13, 1972

[21] Appl. No.: 297,404

[52] U.S. Cl. ....................................... 340/146.1 AQ
[51] Int. Cl...... H04l 1/10, H03k 13/34, G08c 25/00
[58] Field of Search ........................... 340/146.1 AQ

[56] References Cited

UNITED STATES PATENTS 3,538,497 11/1970 Harmon .................... 340/146.1 AQ

*Primary Examiner*—Malcolm A. Morrison
*Assistant Examiner*—R. Stephen Dildine, Jr.
*Attorney, Agent, or Firm*—J. Herman Yount, Jr. et al.

[57] ABSTRACT

A decoder for correcting and decoding convolutional data. Decoding of each digit of sequentially received data is postponed until a plurality of subsequent digits have been received. A message digit is then decoded by comparing the received sequence of data with a limited number of possible messages. The possible message which correlates best with the sequence of convolutional data that was received is temporarily assumed to be the correct sequence for purposes of decoding only the first message digit or perhaps the first few message digits of the data sequence currently being considered. The limited number of possible messages to be compared with the received data are selected at each branch interval by choosing one sequence terminating in each data state. During decoding, the possible messages are represented as sequences of branch transitions among a predetermined number of data states. The transitions among states are traced step by step through the possible message sequences to ascertain the data state of a survivor sequence at the decoding depth. The data state of the highest correlated survivor path is then interpreted into a decoded message bit.

28 Claims, 14 Drawing Figures

CONVOLUTIONAL DECODER

The present invention relates to the field of digital data codes and their correcting and decoding. Errors may be introduced into digital data by noise and other causes. If the code employed is a redundant type, occasional errors can be detected because they do not fit the context. Codes of the type involved here contain sufficient redundancy that a code message containing errors ordinarily can be corrected and accurately decoded. The present invention is a decoder for correcting errors in such redundant data and decoding accurately the original message. The type of redundant codes to which it is applicable are convolutional codes. They are characterized by the fact that when an original message is encoded the choice of code symbols selected to represent an input digit of the original message is affected not only by the input digit itself but also by a limited number of immediately preceeding input digits of the original message. Moreover, during decoding, the decoder's output depends upon its own past; this dependence extends to the infinite past, even though its dependence upon the input digits extends only to the limited number of input digits taken into account simultaneously by the encoder. Consequently, when the convolutional data is decoded to recover the original message, it is desirable to take into consideration a relatively long sequence of encoded digits before deciding upon a particular message digit as being the most probable original one.

The convolutional codes with which the present invention iS concerned can be represented graphically in tree form. At the time of encoding, each bit of the original message causes the selection of one branch from among a plurality of branches emanating from a node, and a message of many successive digits can be represented graphically as a path through the tree. The tree spreads out very rapidly so that a very great number of different paths are possible even when a relatively short series of sequential digits is considered.

A further characteristic of convolutional codes is that every node in the tree can be classified as one of a relatively small number of possible "states" of the data. A data "state" is a code situation such that each possible sequence of future data immediately following that state is decoded in a particular predetermined manner. For example, every node which is classified as a state 2 node is a point from which subsequently received data should be decoded in exactly the same way as it would if that subsequently received data followed any other of the many state 2 nodes in the tree, irrespective of where they may be located in the tree. The same subsequently received data would be decoded differently if it followed another state, e.g., state 3, than it would when following a state 2. A path of a message through the data tree can therefore be represented as a path through an array of data states. Possible data sequences can be represented more compactly in terms of states because a diagram of transitions among data states does not fan out as does the data tree. The data tree is said to coalesce into a data statem diagram, which is referred to herein as a trellis diagram.

In decoding convolutional data, it is desirable to limit the number of trial data sequences whose correlations with the received data are computed and compared. An algorithm for selecting a limited number of promising survivor sequences has been suggested by A. J. Viterbi in "Error Bounds for Convolutional Codes and an Asymptotically Optimum Decoding Algorithm," I.E.E.E. Transactions on Information Theory, Volume IT-13 No. 2, Pages 260–269, April, 1967. In the use of the Viterbi algorithm the possible data sequences entering each state are considered and only one of the sequences entering each state is selected to serve as a trial sequence representing the state. The trial sequence which survives for each state is the one having the highest correlation with the received data of all of the sequences entering that state, but considering only those sequences which still survived after a similar selection was made at each of a number of preceding branch intervals. In accordance with the algorithm a comparison is next made among survivor sequences to ascertain which sequence is the most highly correlated with the data actually received. The sequence thus identified is assumed to be the sequence that was originally transmitted and is called the sole survivor sequence.

Decoding of message digits based upon this assumption is then carried out, however, only for the first one or first few received digits of the sequence. The entire sequence is not immediately decoded. Digits of the sequence following the first few digits are still subject to change on the basis of data to be received in the future when the entire process is repeated.

To summarize the Viterbi algorithm, data is not decoded as soon as it is received. Instead a sequence of data following the digit to be decoded is first collected, the number being called the decoding depth D. Then a limited number of possible messages are selected, each extending throughout the decoding depth far beyond the digit presently to be decoded, with one such survivor sequence ending in each of the data states. A correlation between each survivor sequence and the data actually received is computed for the entire decoding depth under consideration. The highest correlated of the survivor sequences is then selected to be the sole survivor sequence. The earliest received digit or digits within the decoding depth is then permanently decoded under the temporary assumption that the sole survivor sequence is the correct sequence.

SUMMARY OF THE INVENTION

Decoding apparatus is disclosed for decoding convolutional data in a novel way in accordance with concepts similar to those suggested by the Viterbi algorithm. The invented apparatus includes correlators which correlate each newly received branch of data, corresponding to one message digit, with all possible incremental paths representing branch transitions between states. Correlation accumulators compute a new running correlation for every immediately previous survivor path with every possible new branch transition appended. Comparators compare the correlation within each state of all paths entering that state to select the highest correlated path to be a survivor path for that state. Survivor paths are stored in terms of a sequence of transitions along states and not in terms of the states themselves. Another comparator subsequently compares the cumulative or running correlations corresponding to the survivor sequences to identify the survivor sequence having the highest correlation. Tracing apparatus reconstructs at least one of the survivor sequences step by step by utilizing the stored sequential data which describes the branch transitions of those paths between states. The tracing apparatus, in this way, identifies the state or states that were occupied by the survivor sequences at the earlier branch interval when the bit currently to be decoded was received. Logic circuits then interpret the state information to decode a message bit or bits of the original message.

A synchronizer for synchronizing the decoder with the received data is the subject matter of another patent application Ser. No. 294,768 by the same inventors, filed Oct. 4, 1972.

BRIEF DESCRIPTION OF THE DRAWINGS

In FIG. 4 the possible data sequences are shown in terms of data states;

FIG. 13 is a block diagram of another form of the preferred embodiment of the trellis connection computer which may be utilized where higher decoding rates are desired; and, FIG. 14 is still another form of the preferred trellis connection computer portion of the invented decoder; this form is for systems having low data rates so that the work can be performed rapidly enough by serially operating adders and comparators, and parallel-operating ones need not be resorted to.

DESCRIPTION OF THE PREFERRED EMBODIMENTS

Figure 1:
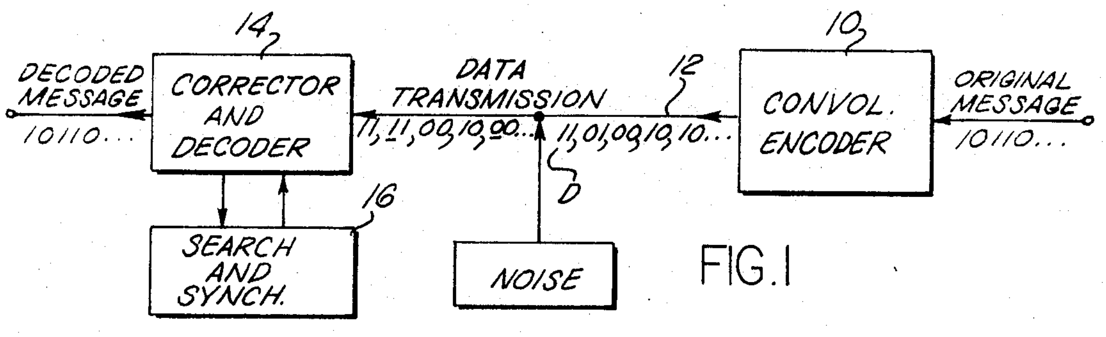
FIG. 1 is a block diagram of a digital data transmission system which is one type of system to which the present decoder is applicable.

Referring to FIG. 1, an original message consisting of successive data digits is entered into an encoder 10 where it is encoded into longer redundant sequence of digits having a convolutional data form. The convolutional data is transmitted over a noisy data transmission channel 12 which introduces errors into the data en route. The noise-corrupted convolutional data is received and entered into a corrector and decoder 14 which is the subject matter of the present invention. Also shown is a synchronizer 16, which is the subject of the other patent application by the same inventors, Ser. No. 94,768 filed Oct. 4, 1972.

The corrector and decoder 14 does not decode each message bit as received, but instead examines the received data over a span of data digits in order to correct the errors and decode the message more accurately. A decoded message, relatively free of errors, appears at the output of the corrector and decoder in a data stream which is delayed with respect to the input data to the corrector and decoder.

By way of numerical example, let the original message be 10110, as shown in FIG. 1. The convolutional encoder 10 can encode the original message into a convolutional code sequence reading 11,01,00,10,10. The convolutional data is transmitted over the noisy channel 12. After the message is corrupted by noise in the data transmission channel, it may read, for example, 11,11,00,10,00. The third and ninth digits of the convolutional data have been altered by the noise. The corrector and decoder 14 receives the erroneous data, corrects the errors, and decodes the data to reproduce the original message 10110, which it presents at its output terminals as the decoded message.

CODE TREE

Figure 2:
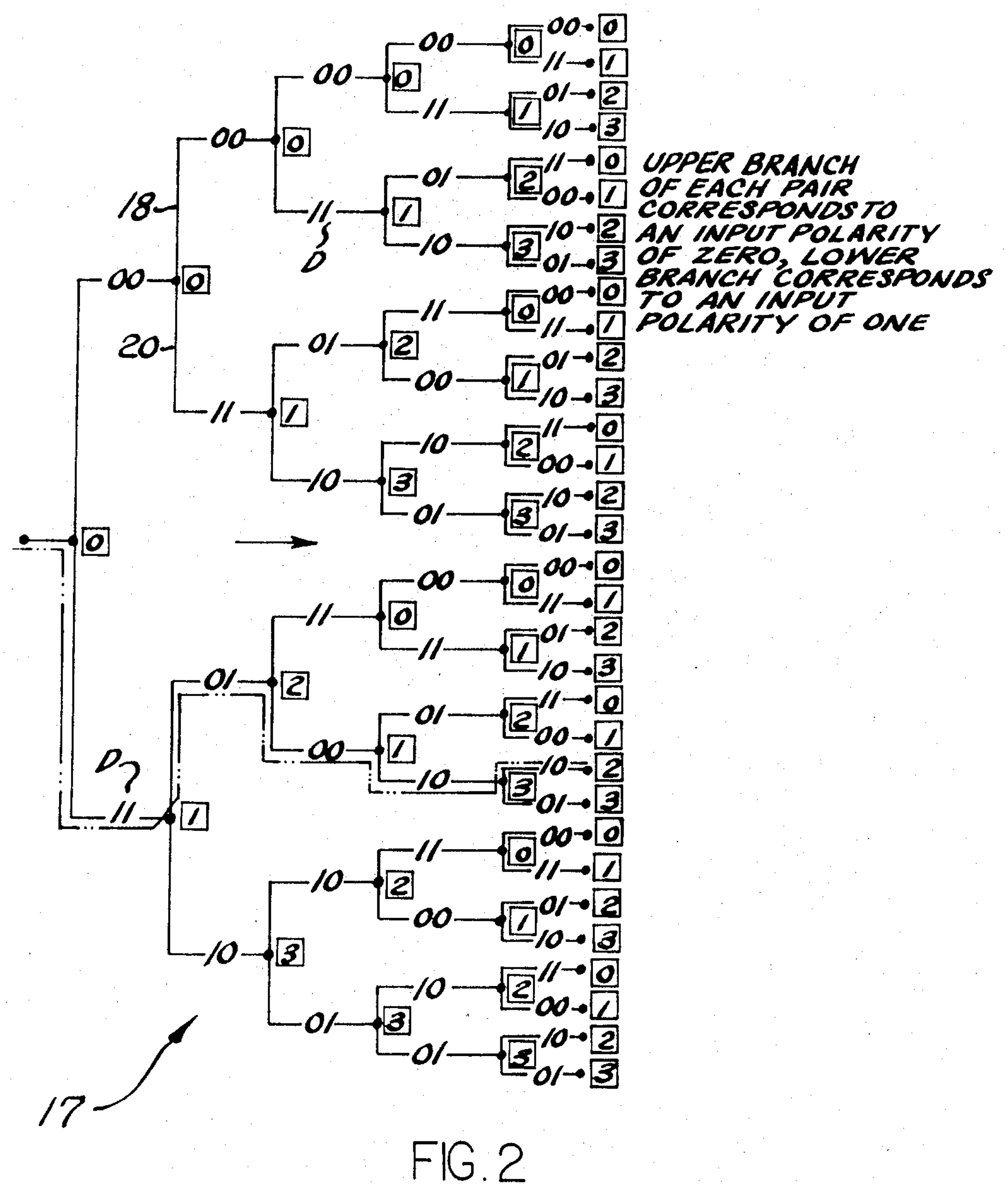
FIG. 2 is a graphical representation, herein referred to as a tree, of possible code data sequences for a short segment of convolutional code having a constraint length 3 and a rate 1/2.

The encoder 10 encodes the original message in accordance with predetermined code characteristics. For the numerical example given above, the encoding rules are those that are depicted graphically on FIG. 2. The graph 17 of FIG. 2 is a tree-shaped representation of all of the possible data sequences that can be produced by a particular encoder, starting in zero state and producing a 10-bit code sequence from a 5-bit original message. In FIG. 2 the upper branch, e.g., branch 18, of each pair of branches emanating rightward from each node corresponds to an original message bit of zero. The lower branch, e.g., branch 20, of each pair corresponds to an original message bit of one. The tree is entered at the left side of FIG. 2. In the example introduced above, the message 10110 corresponds to a route through the tree of lower, upper, lower, lower, and upper branches. The digits marked on each branch of FIG. 2 are the convolutional code symbols produced by the encoder when the branch is selected. In the present numerical example, the first message bit 1 carries the code path from the first node downward to the lower branch which is labelled 11. The encoder 10 produces a 11 output corresponding to this message digit. The other digits cause the encoder to produce code digits of 01,00,10 and 10, respectively, as shown in the dotted path on FIG. 2.

Any sequence of original message bits determines a path through the code tree 17, and the code bits D which are encountered along the path then determine the corresponding output of the encoder 10 into the transmission channel 12. The tree diagram shows that the number of nodes doubles at each succeeding message bit interval along the tree 17. The number of possible paths from left to right through the tree therefore increases exponentially as the number of message bit intervals increases.

DATA STATES

The code bits which are produced at the output of the convolutional encoder 10 are determined by K contiguous original message bits which are within a shift register of the encoder at the tIme. As a result, anY paths in the encoder's code tree 17 for which the most recent K-1 message bits have been identical will put the shift register of the convolutional encoder 10 into a particular "state" so that succeeding input bits will produce a predetermined sequence of encoder output bits. The data sequences are said to coalesce into a number of states. Each of the $2^{K-1}$ different (K-1)-bit groups of bits is called a state of the encoder 17 or of the data sequence. The states of the encoder are numbered herein from 0 to $2^{K-1}$-1 by interpreting each K-1 bit group as a binary number.

Figure 3:
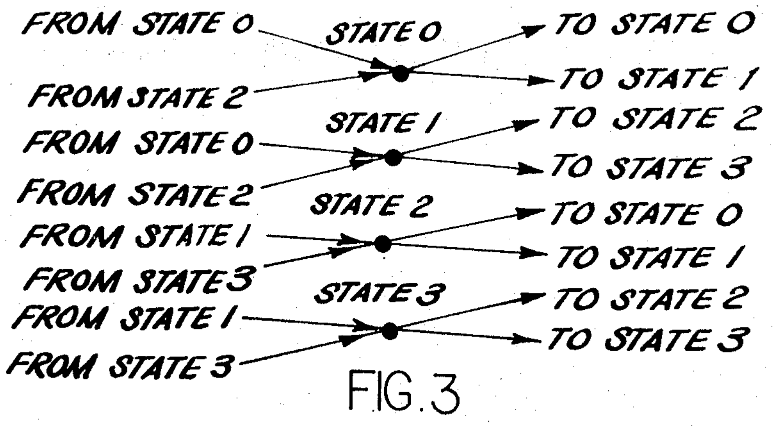
FIG. 3 is a chart showing, for one code as an example, that each node of the tree can be characterized as a data state.

Each node of FIG. 2 is labelled with its state number in a small square. FIG. 2 shows that the portion of the tree which radiates to the right from any node is identical to the portion of the tree which radiates to the right from any other node having the same state number. For example, every node whose state number is 2 is followed to the right by an upper branch whose code digits are 11 and by a lower branch whose code digits are 00 at the first message bit interval following the node. FIG. 3 is a table showing for each state the two ways in which the state can be entered and the two ways in which the state can be left, for the particular code being used as an example.

The numerical example of a message which was introduced above can be pursued on FIG. 3. The message 10110 was previously seen to correspond to the following sequence of branches: lower, upper, lower, lower, upper. On FIG. 3, starting in state zero, the first message bit which calls for selecting the lower branch carries the message path out of state zero along the lower of the two branches passing out from state zero. This lower branch carries the message to state 1, as shown in FIG. 3. The second message bit calls for an upper branch. The selection of an upper branch when in state 1 dictates a transition into state 2, and so forth.

TRELLIS REPRESENTATION OF CODE

Figure 4:
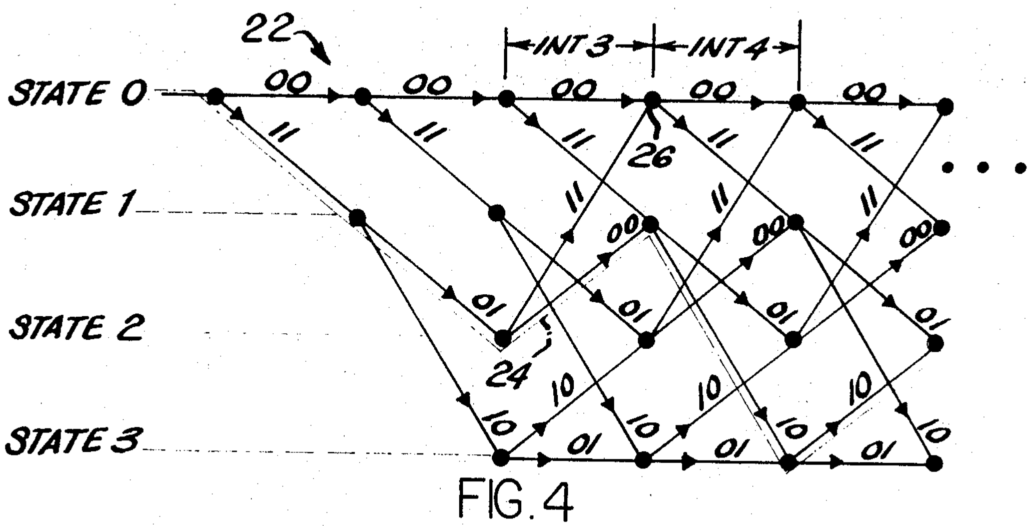
FIG. 4 is another form, called a trellis diagram, for representing possible code data sequences for the same code that w8s represented by FIGS. 2 and 3.

Because of the fact that various paths through the tree coalesce as the paths arrive at a common state, the tree diagram of FIG. 2 can be collapsed into a much more compact diagram drawn in terms of data states. A compact diagram of this type, called herein a trellis diagram 22, is shown in FIG. 4 for the same code as FIGS. 2 and 3. When the diagram of FIG. 3 is repeated so as to represent a sequence of branch intervals, the trellis diagram of FIG. 4 is produced. The first two branch intervals of FIG. 4 are different from the others to show the starting situation when an encoder starts from state zero; all of the remaining node columns are identical. The nodes on each horizontal line of FIG. 4 correspond to a common state. All of the nodes on a common vertical line correspond to a common branch interval. The sequence of events in the foregoing numerical example can be seen much more clearly by following the example through the trellis 22 of FIG. 4 where the transitions between states are repeated indefinitely. The original message 10110 is shown on FIG. 4 as a dot-dash line 24 ending in state 2. If the entire sequence were displaced to the right by any number of branch intervals, the pattern followed by the message through the trellis diagram would be identical because identical data following any state zero is always identically decoded, and this is true of any state. Note that, in the complete trellis 22, two branches lead into each node or state, and two branches exit from each node or state. In FIG. 4, the older received data is represented by the left side of the diagram and the more recently received data is represented bY the right side.

SURVIVOR SEQUENCES

Figure 5:
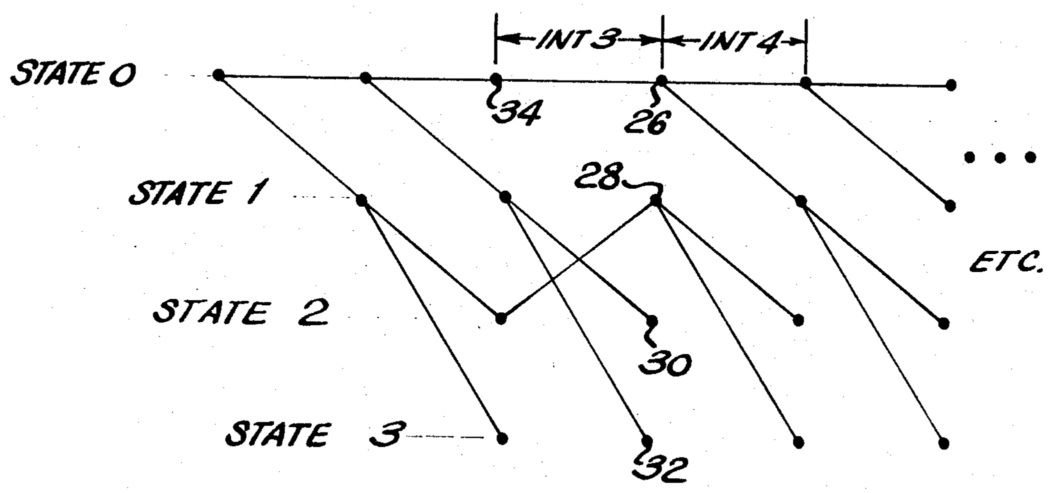
FIG. 5 is another trellis diagram representing the same code as was shown in FIGS. 2, 3 and 4 but showing only one survivor path into each state at each branch interval instead of showing all of the possible paths.

When convolutional codes are decoded by the apparatus disclosed herein, one path is retained entering into each state and the other path or paths entering into the state are discarded. FIG. 5 is a specific example of this type of path selection. The nodes 26, 28, 30, 32 at the end of branch interval 3 shown on FIG. 5 are typical. They show one path from the preceding nodes entering into each of the states 0, 1, 2, 3. Other paths entering into those states were discarded because they had lower correlations than the paths which were retained. At the nodes at the end of message bit interval 4, one path has again been selected as a survivor for entering into each of the states 0, 1, 2 and 3. In the example, no paths were drawn outward to the right from node 30 of state 2 at the end of branch interval 3, or from node 32 of state 3 at the end of branch interval 3; the paths corresponding to the nodes in states 2 and 3 at the end of that branch interval were abandoned.

At the end of each branch interval in FIG. 5, the survivor path which is chosen to enter into each state is selected from among the paths which are capable of entering that state, and it is the one which has the highest correlation with the data actually received. In this way four survivor paths are always preserved, in the particular example of FIG. 5, one path terminating in each of the states at the end of the most recently received branch interval. The example of FIG. 5 is different from the previous numerical example.

Associated with each of the survivor paths is a running correlation whose value described how well that path matches the data actually received. During each branch interval, all of the correlations are recomputed so that in the example of FIG. 5 four new up-dated values of cumulative correlations are available at the end of each branch interval. In FIG. 5, the constraint length K is 3; in general, at each branch, $2^{K-1}$ paths through the trellis are retained by the decoder, this being the number of states.

TRELLIS DATA

In the trellis diagram 22 of FIG. 4 each node connects to one of two nodes at the preceding column of nodes, and only one of those two connections, that is, the upper or lower connection, is retained. An incomplete trellis connection diagram such as the particular one illustrated in FIG. 5, can therefore be represented by storing only one bit of information for each node to denote which of the incoming connections was retained. The upper path in every case is represented by a logic symbol zero and the lower path is represented by a logic symbol one. For example, in the case of the column of nodes at the end of branch interval 3, FIG. 5, the transition during interval 3 entering into node 26 can be represented by a zero because that node was entered by taking the upper one of the two possible connections by which state zero could be entered, namely, the connection from node 34 in state zero at the beginning of message bit interval 3. A set of survivor path selection data corresponding to branch interval 3 of FIG. 5 is therefor as follows: 0,1,0 and 0, corresponding to nodes 26, 28, 30 and 32 respectively. This is referred to herein as trellis connection data.

TRACING

Sequences of trellis connection date corresponding to a sequence of branch intervals are a compact and convenient form for storing a description of the survivor sequences through an incomplete trellis diagram. However, because the data describe only transitions or changes rather than states themselves, it is necessary to trace through a survivor sequence path step by step, utilizing the trellis connection data just described to determine states. In order to ascertain the state of a survivor path at a particular branch interval, a knowledge is required of the state at some point on the path which can serve as a starting point for a branch-by-branch tracing operation. In the example of FIG. 5, $2^{K-1}$ bits of storage are required for each branch interval of the incomplete trellis diagram when it is represented in the trellis connection fashion just described.

All forms of the apparatus disclosed here for decoding convolution codes use trellis connections of this type for storing the survivor sequences. The various forms of the preferred embodiment differ in the way the decoded message bits are determined from the trellis connections and also in the way the correlations are computed.

TRELLIS CONNECTION COMPUTER

Figure 6:
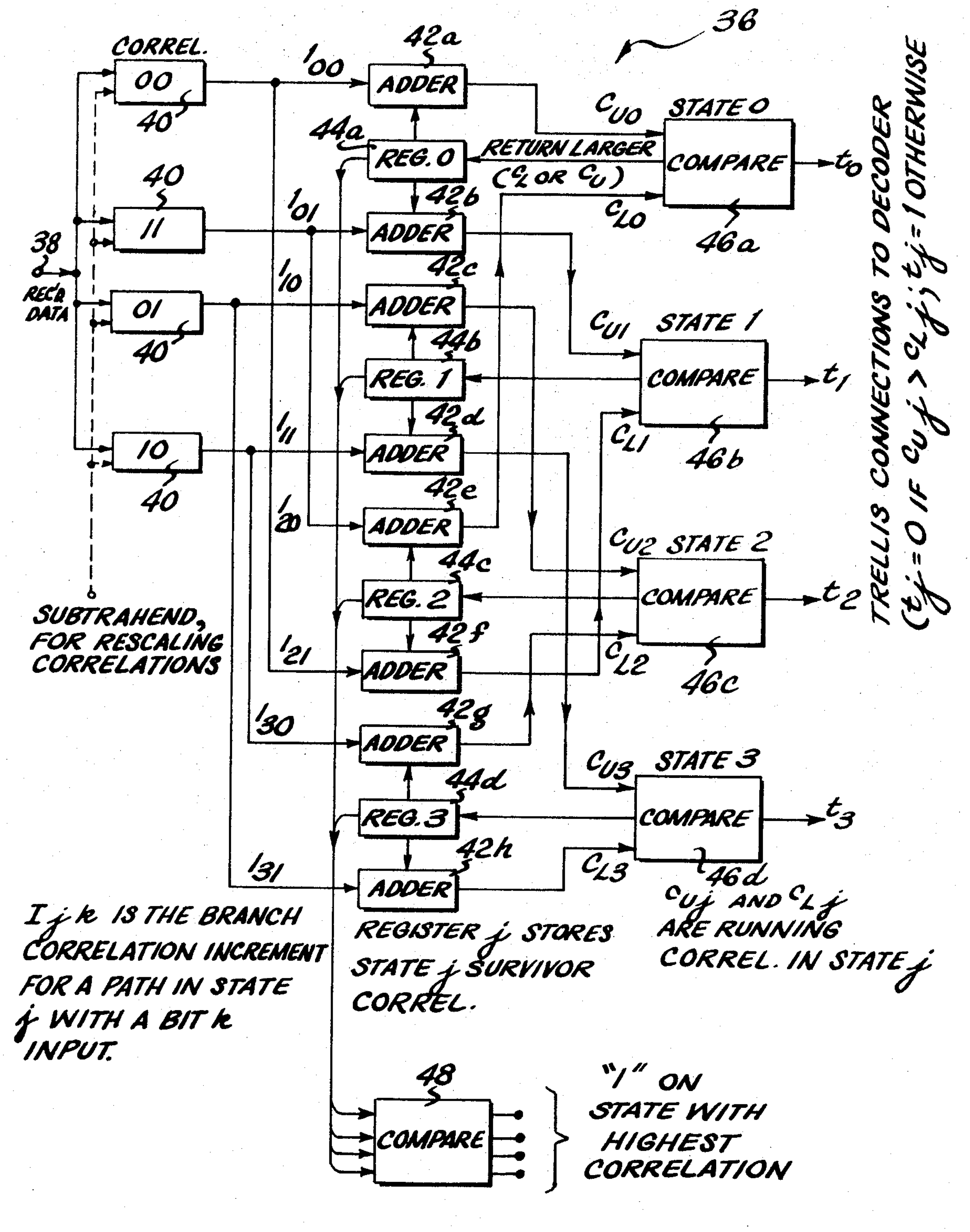
FIG. 6 is a block diagram of a trellis connection computer for a constraint length 3 code for determining surviving transitions between states.

All disclosed forms of the invention use logic circuits for computing correlations of various possible survivor paths with the data actually received, and for selecting the paths which are to survive. The circuits must also describe those survivor paths in terms of trellis connection data, that is, in terms of transitions between states. One circuit 36 for performing these functions is shown in FIG. 6 for the code of constraint length 3 and rate 1/2 displayed in tree form in FIG. 2. The rate is a quotient of the number of original message bits over the number of convolutional code bits corresponding to them. In FIG. 6, the convolutional code data bits for the most recent branch bit interval enter the equipment at the left side 38 of the diagram; binary data describing the trellis connections for that branch interval are the outputs $t_0$, $t_1$, $t_2$, $t_3$ at the right side of the diagram. One such output is provided for each state. A binary zerO output indicates that the state was entered by an upper path transition from the preceding state during the most recent branch interval, and a binary one signifies that the state was entered by a survivor path which was the lower of two possible paths shown on the trellis diagram 22 of FIG. 4.

In the circuit 36 of FIG. 6, the received convolutional data for the most recent branch interval is processed simultaneously in four correlators 40, each of which computes a correlation increment. Each such correlation increment is the correlation of the latest received branch data with a data pattern which each correlator is prewired to represent. One correlator 40 is used for each possible received branch, i.e., 00,11,01,10.

The term correlation is used herein in a broad sense to mean either the precise mathematical definition of the term or a broader definition encompassing other quantitative measures of similarity between two functions. For example, the correlation may be additive instead of multiplicative.

The output of each correlation increment computer 40 is connected to two adders 42*a*, etc. one corresponding to each of the two states which can be entered by means of convolution data for which that correlator is prewired. Four registers 44*a*, 44*b*, 44*c*, 44*d*, one for each state, are provided for storing cumulative path correlations for the paths currently occupying the states. The cumulative correlation already standing in each register 44*a*, 44*b*, 44*c*, 44*d* is added to the correlation increment for the upper path which exits from the state and is also simultaneously added to the correlation increment for the lower transition path by which such state may be departed and new sums are thereby produced representing the cumulative correlations for each of the two paths by which the state may be left. These correlations are designated CU or CL plus a subscript denoting a state which is their destination.

One comparator 46*a*, 46*b*, 46*c*, 46*d* is provided for each state. Each comparator compares the cumulative correlation of the upper path entering into the state with the cumulative correlation of the lower path entering into the state, and selects the larger of the two as being the more attractive path to preserve as a survivor. Thus the comparator 46*a*, 46*b*, 46*c*, 46*d* for each state selects one path at every branch interval, so that, after selection, every state has one path entering it. Many of the survivor paths thus selected are later abandoned; at the end of the most recent branch interval, only one path into each state still survives. Each comparator 46*a*, 46*b*, 46*c*, 46*d* transmits the larger of the two up-to-date correlations to its corresponding correlation register 44a, 44*b*, 44*c*, 44*d*, to save it.

It should be observed that as trellis data connections are sequentially computed by the equipment 36 of FIG. 6, the cumulative correlation associated with each survivor path is transferred about among the states. For example, the cumulative correlation in register 44*a* for state zero can be added to the correlation increment $I_{01}$ in the adder 42*b* and the sum is connected as correlation CU1 into the comparator 46*b* corresponding to state 1. If the correlation CU1 is larger than correlation CL1, which also enters the comparator 46*b*, the comparator 46*b* will enter correlation CU1 into register 44*b* of state 1 when its comparison has been completed. The correlation of a path which was previously in state zero and stored in register 44*a* of state zero has thereby been transferred to register 44*b* because the path with which it is associated has in the most recent branch moved from state zero to state 1.

In the manner just described, the trellis connection computer 36 of FIG. 6 computes, upon every branch interval, a number of correlation increments corresponding to the most recently received convolution code branch, and adds those increments to existing cumulative correlations. Comparators 46a, 46b, 46c, 46d then select the higher correlated path into each state for survival and return the new cumulative correlation to a storage resigter 44a, 44b, 44c, 44d. Each comparator 46a, 46b, 46c, 46d produces an output trellis connection datum $t_0$, $t_1$, $t_2$, $t_3$ indicating which path, the upper or the lower, was selected by the comparator of each state.

FIG. 6 also shows a four-input comparator 48 for comparing the cumulative correlations of the four survivor paths to select the survivor path having the highest cumulative correlation to be the sole survivor. This information and the trellis data $t_0$, $t_1$, $t_2$, $t_3$ are utilized by tracing equipment such as a switch matrix decoder, to be described below, to decode the original message.

SWITCH MATRIX DECODER

Figure 7:
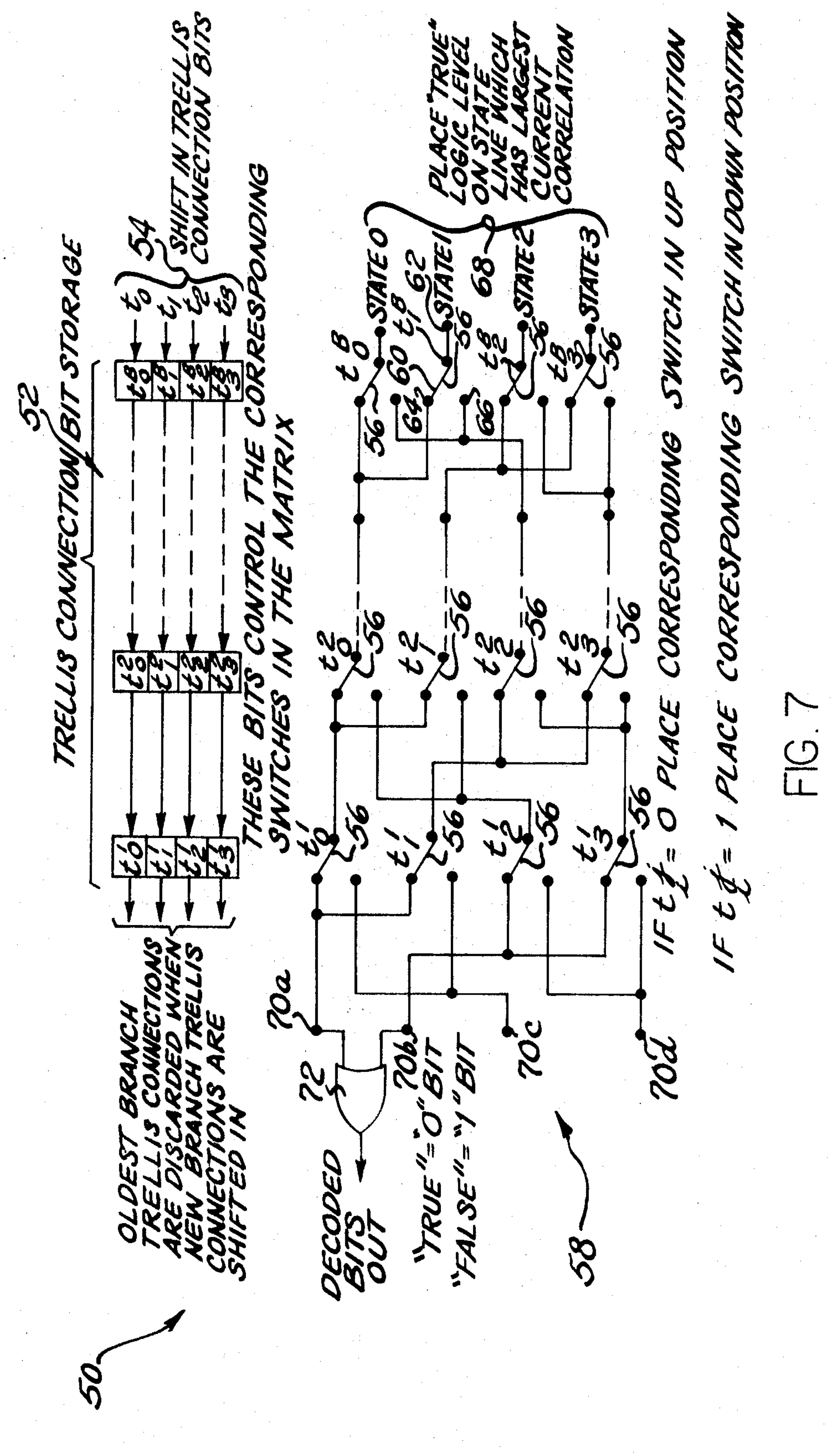
FIG. 7 shows a trellis connection switch matrix decoder for a constraint length 3 code which can be utilized for decoding message bits when the survivor sequences are known in terms of transitions between states and their correlations are known.

FIG. 7 shows a switch matrix decoder 50 for utilizing the trellis connections $t_0$, $t_1$, $t_2$, $t_3$ to determine decoded message bits. The decoded message is identical to the original message as it existed before encoding into convolutional form, or is nearly identical thereto. A shift register 52 is provided for storing the trellis connection bits which are produced by the computer 36 shown in FIG. 6. Storage is provided for the most recent B branches of trellis connections. Trellis connection data is entered into the shift register at the input terminals 54 and shifted upon each branch interval to the next succeeding stage to the left-hand end, where it is discarded.

The condition of every stage of the shift register 52 is monitored by output lines which connect to the coils, not shown, of relays 56. Each row of the shift register 52 as drawn corresponds to a state and each column of the shift register 52 corresponds to a branch interval, or column of nodes. The oldest trellis connections are at the left side of the shift register 52. Contacts of the relays are arranged in rows and columns in FIG. 7 with the rows corresponding to states and the columns correspond to branch intervals so that the array of relays 56 is similar to the array of stages of the shift register 52 to which they respectively correspond.

A logic zero in any stage of the shift register 52 deenergizes the corresponding relay 56 and places the transfer arm of the relay in the upper of its two switch positions. A logic 1 in a stage of the shift register 52 energizes the corresponding relay 56 and places its transfer arm in the lower position. Contacts of the relays are interconnected in a network 58 in accordance with the transitions between states of the complete trellis diagram 22 of FIG. 4. For example, whenever the relay 56 of state 1 corresponding to the most recent branch interval has a logic 1, the transfer arm 60 of the relay is in the lower position and the transfer arm represents a transition from state 2 at the beginning of the branch interval to state 1 at the end of the branch interval. The terminal 62 of the relay's transfer arm corresponds to a node namely, in this example, the node of state 1 at the end of the most recent branch interval. The upper switch terminal 64 of that relay corresponds to the node at the beginning of that branch interval in state zero, and the lower switch terminal 66 of that relay represents the node of state 2 at the beginning of the subject branch interval. By selective energization of relays the switch matrix effectively constructs the most recent B branches of an incomplete trellis diagram, such as that shown for a particular numerical example in FIG. 5.

After each branch of trellis connections is shifted into the shift register 52, a 1 logic voltage level is placed at the right of the switch matrix on the state line 68 having the highest current cumulative correlation. Comparator 48 of FIG. 6 can provide such a signal. That state is the current state of the most promising trial message. The purpose of the switch matrix 58 is to determine the state occupied by that particular path B branch intervals in the past, that is, at the left-hand end of the switch matrix of FIG. 7. Only the first bit of two bits which can be ascertained by a knowledge of that state is to be decoded during the current branch interval. All of the manipulations of later-received data were performed to assist in the proper decoding of that one bit.

The 1 logic voltage level placed on one state line 68 at the new-data end of the switch matrix 58 is transmitted through the switch matrix 58 along a path determined by the energization of the relays 56 and it appears as a voltage level at one of the four state terminals 70a, 70b, 70c, 70d at the old-data end of the switch matrix 58. The state in which the signal appears at the old-data end is the state occupied by the highest-correlated sole survivor path B branch intervals in the past.

In the case of the particular code form being used herein as an example, a knowledge of the state of a data sequence provides definitive information as to the K-1 immediately preceding message bits by which that state was entered. The message bits referred to here are bits of the original message before encoding, and not convolutional code bits nor trellis data bits. State zero can be entered only by an original message sequence of 0,0. State 1 can be entered only by an original message sequence 0,1, and states 2 and 3 can be entered only by sequences 1,0 and 1,1 respectively. This may be seen on the trellis diagram 22 of FIG. 4 on which, for example, any node of state zero can be entered either by a convolutional code 00,00, from the immediately preceding two branches, or by a convolutional code 11,00, or by 10,11. or by 10,11. All four of the possible paths for entering a state 0 node are the upper paths of the two paths emanating rightward from the preceding nodes; all routes for entering state zero therefore correspond to message bit sequence 0,0. Only the first of the two original message bits by which a state is entered is decoded upon each branch interval by the switch matrix decoder of FIG. 7.

A logic OR circuit 72 is connected at the old-data end of the switch matrix decoder 50 of FIG. 7, with one of its two inputs connected to receive signals from the state zero terminal 70a and the other input connected to receive signals from state 1, terminal 70b. Appearance of a logic 1 voltage signal at either of those two states causes a logic 1 voltage signal at the output of the OR gate 72 signifying that the highest-correlated path was in either state zero or state 1 after receiving the two message bits of which the first is being decoded. The message bit being decoded is therefore a logic zero, because only a logic zero as the first bit of a two-bit message sequence is capable of placing a data sequence in states zero or 1. A logic 1 output from the OR circuit 72 is therefore interpreted inversely as a logic zero message bit. If the voltage level did not appear in either state zero or state 1, then it must have appeared at either terminal 70c or 70d corresponding to state 2 or state 3, respectively, because the network interconnecting the relays 56 of the decoder matrix 58 is such that the voltage must appear at one of the four output terminals 70a, 70b, 70c, 70d at the left side. Consequently, a logic zero output from the OR gate 72 indicates that the highest correlated path is in state 2 or state 3 at the old-data end and the original message bit was a logic 1.

There is a (B+K-2) bit delay in decoding. A value of B equal to 6K or less is likely to be a practical value beyond which only slight improvement in performance can be achieved.

STATIC SWITCH MATRIX DECODER

Figure 8:
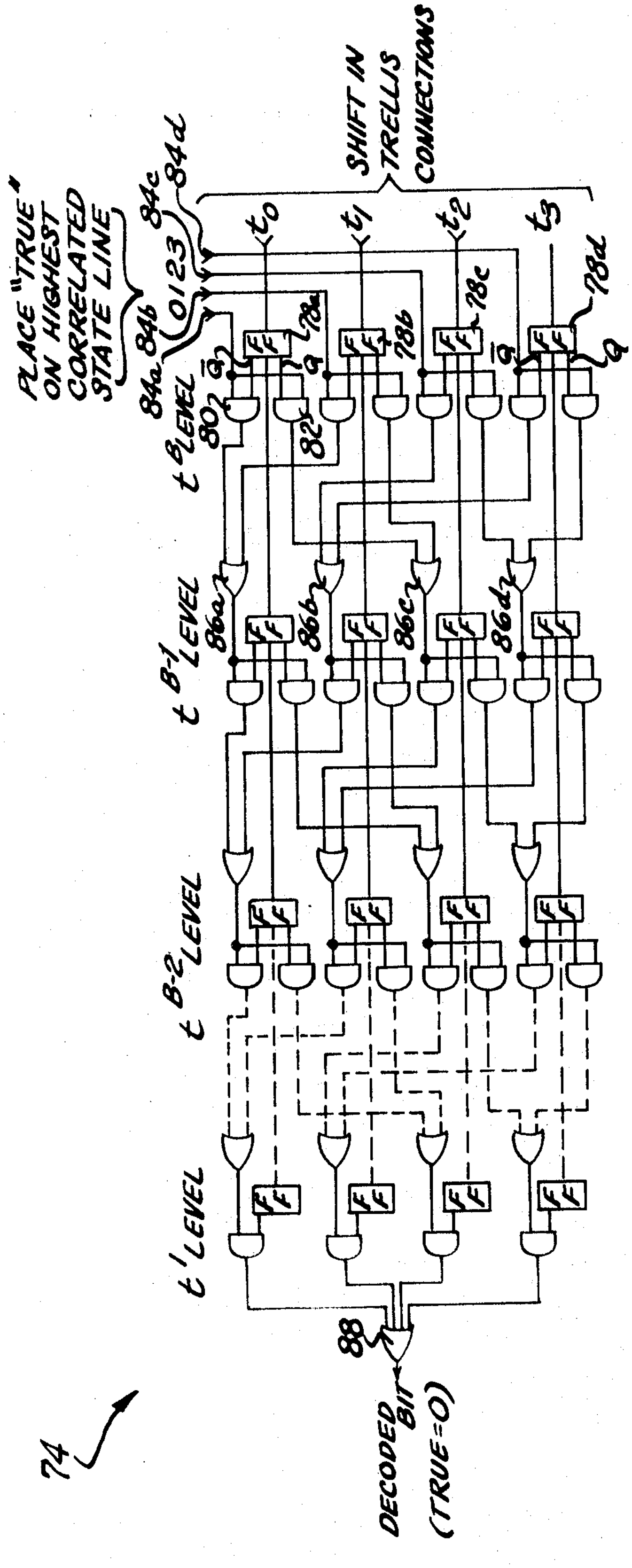
FIG. 8 is a logic circuit block diagram of a static logic circuit implementation of the switch matrix decoder.

Another form 74 of a matrix decoder is shown In FIG. 8 where, as before, a code constraint length of 3 is selected for illustration. In FIG. 8, the trellis connection shift register diagram is merged with the matrix diagram and the relays of FIG. 7 are replaced by logic gates which perform a similar function. Trellis connection data $t_0$, $t_1$, $t_2$, $t_3$ is entered into flip-flops 78a, 78b, 78c, 78d at the right side of the diagram as the trellis connections are computed, and the data is shifted leftward successively through the columns of flip-flops upon each branch interval. The oldest trellis data is therefore in a column of flip-flops at the left side; the trellis data is discarded when it is shifted out of the left-hand column of flip-flops.

The asserted output Q of the flip-flop 78a, which is the lower output terminal in this diagram, is connected to one input of an AND gate 82 and the negated output $\overline{Q}$ of flip-flop 78a is connected to one input of another AND gate 80. When flip-flop 78a is in a logic 1 condition, the AND gate 82 is enabled and the AND gate 80 is disabled. Each such pair of gates 80, 82 forms a static selector switch. The other input of each AND gate 80, 82 is connected to one of four state terminals 84a, 84b, 84c, 84d to which a logic voltage level may be applied. A logic 1 voltage level is applied to the state terminal of the state occupied by the highest-correlated survivor path evaluated at the newest trellis data. For example, a logic 1 may be applied to terminal 84a. The signal thus supplied is transmitted through only one of the two AND gates 80, 82 in accordance with the condition of the corresponding flip-flop 78a. The output of one of the AND gates 80, 82 is directed toward one of the state at the $t^{B-1}$ column of flip-flops, and the output of the other AND gate 82, 80 is directed toward a different state at the next-older column. In order that each state may be accessed by more than one of the static selector switches such as 80, 82 just described, an OR gate such as gates 86a, 86b, 86c, 86d is provided for each state at each column of the static switching array. At the old-data end of the switching array, AND gates are provided for the negated outputs of the last ($t^1$) column of the flip-flops for all four states. Appearance of a logic 1 at the output of any of those AND gates signifies that the highest correlated path was in either state 0 or state 1 at the end of the branch which follows next after the branch for which a bit is currently to be decoded. No matter what state a path occupies, if the trellis connection at its current node is 0, the preceding state was either state 0 or state 1; the first of two message bits leading into state 0 or state 1 is always 0, with this code. When a logic OR circuit 88 at the output of the matrix produces a logic 1 output an original message bit of 0 is indicated, and when the OR gate 88 produces a logic 0 output, the original message bit is interpreted as a logic 1.

TRACE FORWARD DECODER FOR K-1 BITS

Figure 9:
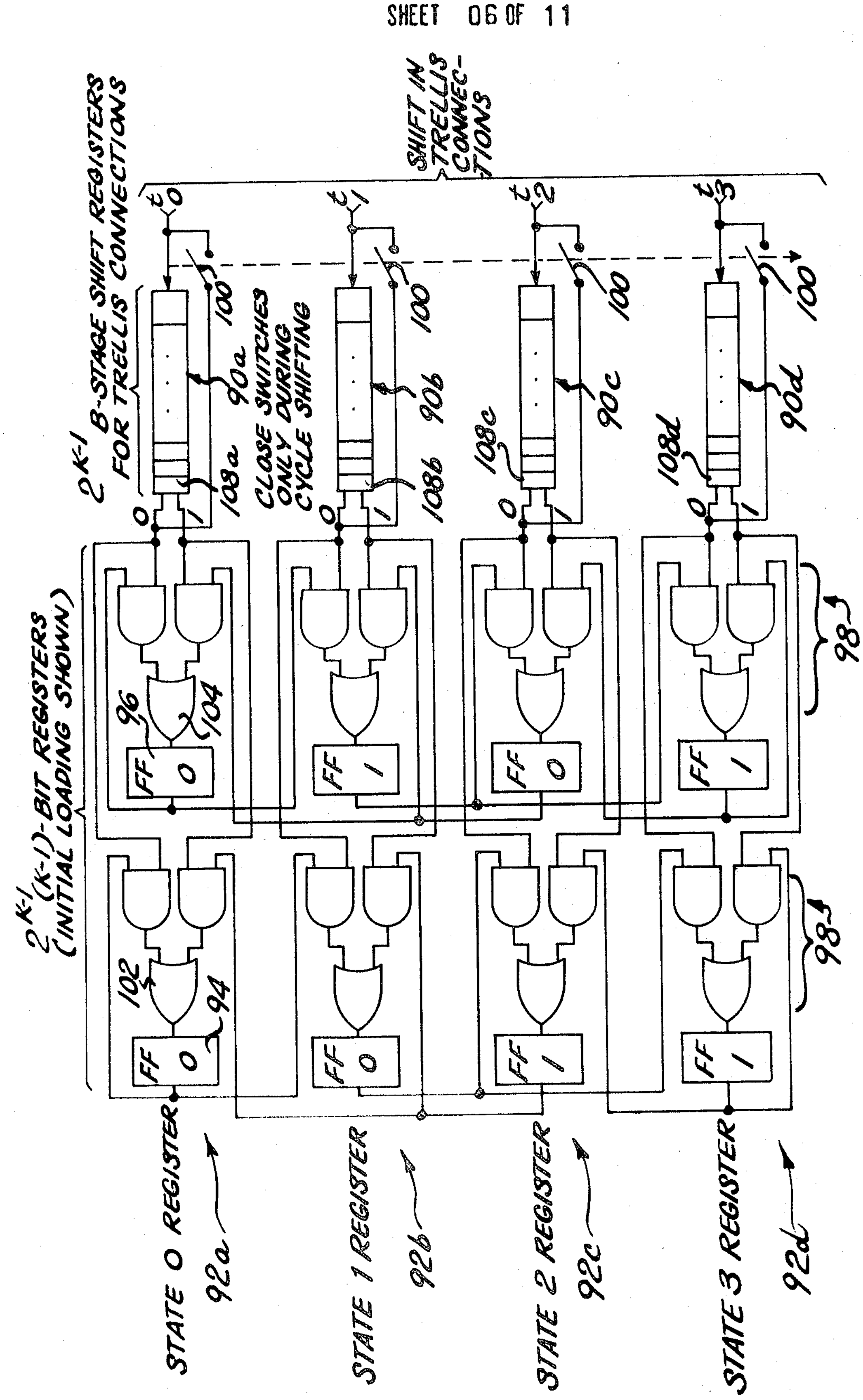
FIG. 9 is a circuit block diagram of another form of the preferred embodiment of the present invention showing a portion of the decoder that is employed for decoding message digits when transitions between states, describing the survivor paths, are known; a trace forward technique is utilized.

FIGS. 7 and 8 described above portray two forms of a means for tracing survivor paths. All forms of the invention include some such means for tracing paths between a state occupied at the new-data end of a path segment and a state occupied by the same path segment at and near the decoding depth. The tracing is necessary because survivor paths are expressed in terms of trellis connections which disclose only transitions between states in stepwise fashion and do not, of themselves, reveal the states occupied by the path being described. Another form of the means for tracing survivor paths is shown in FIG. 9, in which the tracing is conducted from the old-data end of a sequence of B branch intervals to the new-data end of the sequence. This direction of tracing Paths through the trellis connections to ascertain states is referred to here as the forward direction. In FIG. 9, $2^{K-1}$ shift registers 90a, 90b, 90c, 90d each having B stages are provided for storing trellis connections $t_0$, $t_1$, $t_2$, $t_3$. One of the registers 90a, 90b, 90c, 90d corresponds to each state.

Loading of trellis connections into the B-stage shift registers is the first step of the decoding operation. Trellis connection data is entered into the shift registers from the right side of the diagram; the oldest of the B trellis connections are therefore in the left-hand end of the shift registers 90a, 90b, 90c, 90d. While the trellis connection data is being loaded into the registers the recirculating switches associated with the registers are in the open position.

The left half of FIG. 9 shows $2^{K-1}$ trace registers each capable of storing K-1 bits. Where the constraint length K is 3, there are four such trace registers 92a, 92b, 92c, 92d, one for each of the four data states, and each register has a storage capability for two bits, for example register 92a comprises stages 94 and 96. These registers are provided with AND-OR inputs 98 as shown so that the contents of the two-bit trace register associated with one state can be shifted into the trace register of a different state. It may be seen from the logic connections of FIG. 9 that the two bits that are initially in any one state always remain together because when the first bit is shifted to a different state, the second bit is shifted into that same new state. In a second step of the decoding operation the trace registers are loaded with data as follows: state 0, 00; state 1, 01; state 2, 10; state 3, 11, as is shown on the flip-flops on FIG. 9. The initial contents of each of the two-bit registers 92a, 92b, 92c, 92d is, therefore, a binary number identifying the state.

A third step of the decoding operation is performed with the recirculating switches 100 of the B-stage shift registers in the closed position for cyclic shifting in ring fashion of the contents of the B-stage shift registers 90a, 90b, 90c, 90d. During the third step the B-stage shift registers are shifted cyclically B times. Also, for timing, command pulses are provided to the two-bit trace registers. Timing lines are omitted from FIG. 9 and from some of the other diagrams to prevent cluttering the diagrams, where such lines are conventional. Upon the trailing edge of a command pulse, data standing at the output of OR gates, such as 102, 104, are written into the two stages of the registers, such as 94, 96. The data which is written is the data which was standing on the output of the OR gate 102, 104 immediately prior to the trailing edge of the command pulse. Each of the two-bit registers 92*a*, 92*b*, 92*c*, 92*d* is thus reloaded with data, whichmay be data from a different register 92*a*, 92*b*, 92*c*, 92*d* or which may be the same data that it previously contained itself. The interchanging of data in the trace registers 92*a*, 92*b*, 92*c*, 92*d* is controlled by the trellis connection data currently in the oldest-data stage 108*a*, 108*b*, 108*c*, 108*d* of each of the B-stage shift registers 90*a*, 90*b*, 90*c*, 90*d*. As the cyclic shifting of B-bit registers proceeds, the two-bit number which was initially loaded into each trace register 92*a*, 92*b*, 92*c*, 92*d* is transferred about among the trace registers. For example, the number 01 which was initially stored in the state 1 register 92*b* may be shifted to the state 2 register 92*c*, then to the state 0 register 92*a*, back to the state 1 register 92*b*, and so forth in accordance with the sequence of trellis connection data reading from the old-date end to the new-data end.

The four two-bit initial loading numbers serve as tags for identifying the paths which were initially occupying states 0, 1, 2 and 3. At the end of the shifting operation, the two-bit number in a state *i* register represents in binary form the number of the state occupied by the current state *i* survivor sequence B branches in the past. The two-bit number has been carried along through a path executed among the four states in a forward tracing direction to the most recently received branch interval. After B shifts, for example, the state 0 trace register 92*a* may contain the bits 10 signifying that the survivor path which, at the new-data end, occupies state 0, was occupying state 2 at the old-data end of the B message bit intervals being analyzed. To pursue the example, at the end of the same B shifts, state 1 register 92*b* may contain the bits 00, state 2 register 92*c* may contain the bits 10 and the state 3 register 92*d* may contain bits 10. Thus, three of the survivor paths in this example, namely, those occupying, at the new data end, states 0, 2 and 3, were occupying state 2 at the old-data end. One of the survivor paths, namely, the one occupying the state 1 register 92*b* at the new-data end, was occupying the state 0 register 92*a* at the old-data end of the path sequence under consideration. In this example, whatever survivor paths were occupying states 1 and 3 at the old-data end no longer survive, having been discarded in favor of higher-correlated paths somewhere in the B branch intervals between the old and new ends of the sequence.

The K-1 bits in the register 92*a*, 92*b*, 92*c*, or 92*d* corresponding to the state of the currently highest-correlated path are the decoded output bit decisions resulting from the shift exercise just performed. Thus, in the K=3 example being pursued, two original message bits are decoded by each complete shifting routine. (K-1) more branches of trellis connections are read into the B-bit shift registers 90*a*, 90*b*, 90*c*, 90*d* preparatory to performing another shifting routine, thus discarding the (K-1) oldest brnaches from those B-stage shift registers. The $2^{K-1}$ registers 92*a*, 92*b*, 92*c*, 92*d* are then reloaded with the (K-1) bit initial loading data shown on the flip-flops in FIG. 9 and the shifting operation is repeated. Output of the decoded bits is obtained by conventional logic gates, not shown, which selectively accesS the particular two-bit state register 92*a*, 92*b*, 92*c*, 92*d* which is currently storing the path having the highest cumulative correlation at the new-data end according to comparator 48 of FIG. 6.

The state of the highest correlated path B branches in the past, when expressed as a two-bit binary number, is the two-bit decoded message sequence. This comes about because of the particular structure of the code employed as an example herein. For any state, the state number is identical with the information bits of every possible path into the state because the state can be entered only by means of those particular message information bits, as was described above. State 0 can be entered only by means of information bits 0,0. State 1 can be entered only by means of the information bits 0, 1, and states 2 and 3 can be entered in no other manner than by the sequence of original information bits 1, 0 and 1, 1, respectively, for this particular code. For other codes, different final decoding logic may be provided.

The tracing technique of FIG. 9 has the advantage of simplicity of the storage for the trellis connections. The storage is simply serial-in/serial-out/shift registers 90*a*, 90*b*, 90*c*, 90*d*in which sequential access to the trellis connections is sufficient as contrasted with the switch matrix technique above where simultaneous access to all the trellis connections is required. The bit decoding rate capability of the circuit of FIG. 9 is dependent upon the number of shifts necessary to decode a bit. The number of shifts per bit decoded is $B+K-1/K-1 = 1+ B/K-1$. For a sytem in which $B$ is selected equal to 6K, which is sufficient in many circumstances to obtain almost all of the preformance of which the code is capable, the shift rate is approximately seven times the bit rate. This number is obtained because K-1 new branches of trellis connectionS must be shifted in and then the registers such as 90*a*, 90*b*, 90*c*, 90*d* must be shifted cyclically B times to decode K- 1 bits. Storage must be provided for the received branches of convolution code that arrive during the time that the B-bit trellis connection registers are being cyclically shifted.

TRACE FORWARD DECODER FOR ANY NUMBER OF BITS

Figure 10:
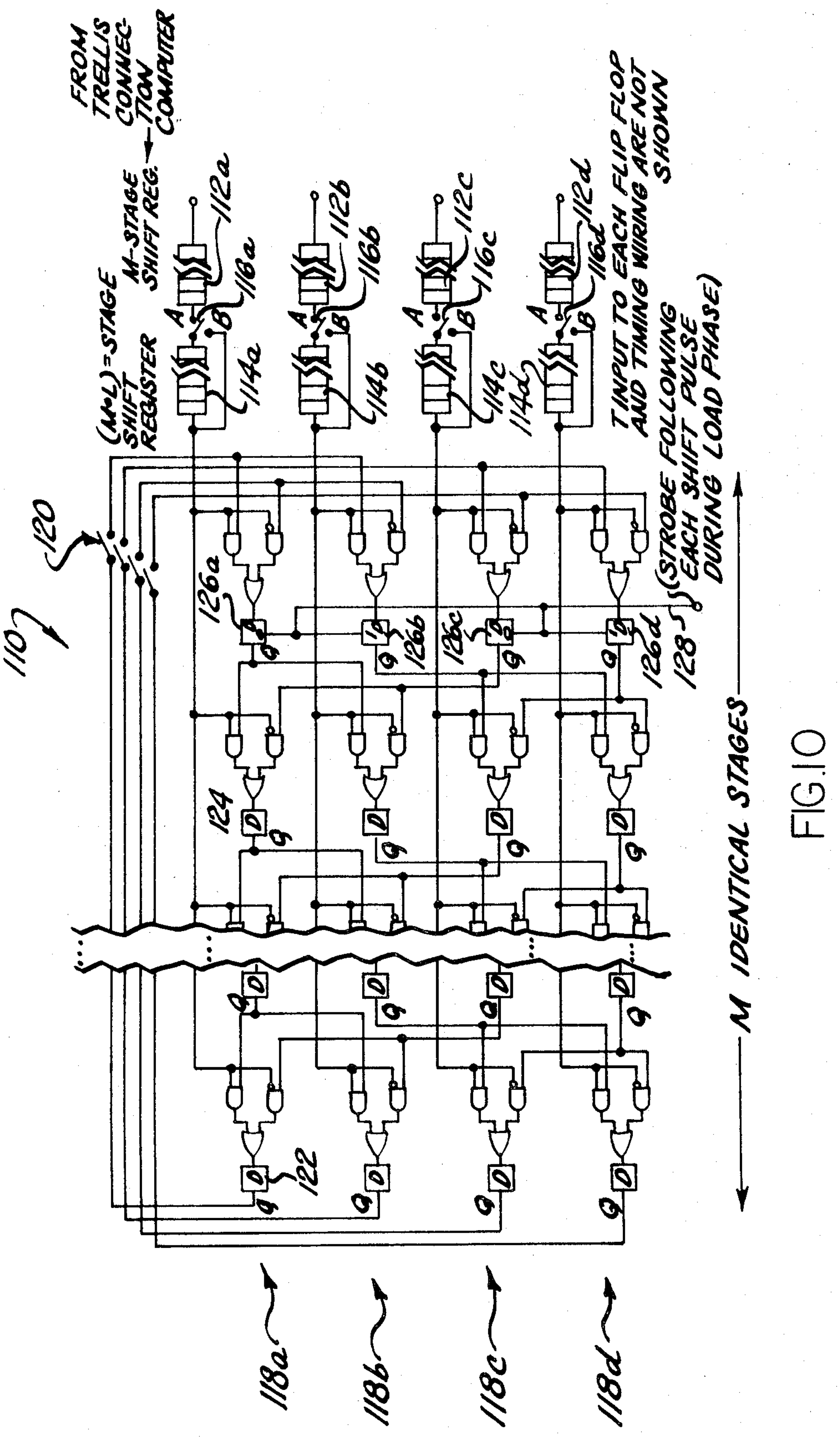
FIG. 10 is a circuit block diagram showing a form of the trace forward decoding technique in which more than one message bit may be decoded during each execution of the decoding routine.

Another form of equipment for executing the trace forward technique is shown in FIG. 10. Rather than decode only K-1 bits in a single pass through the trace forward computer, the equipment 110 of FIG. 10 can decode an arbitrarily large number of bits. The basic technique is similar to the one described for FIG. 9 except that the $2^{K-1}$ registers which are used to store the trial information sequences have M bits instead of K-1 bits. The initial loading of these M-bit registers is accomplished conceptually by making the first K-1 bits equal to the state number as was done previously and then determining the remaining M-K+1 bits in accordance with the first M-K+1 trellis connections. The first M-K+1 trellis connections are examined, and decoded message bits constituting portions of trial messages are determined in accordance with the first trellis connections and are entered into remaining stages of the M-bit registers.

The equipment shown in FIG. 10 is for one method of accomplishing these conceptual steps, illustrated for a code having a constraint length of 3. Each of the four horizontal rows of the figure corresponds to a state. Trellis connections enter the circuit 110 from the right side and are stored first in M-stage shift registers 112*a*,

**112*b*, 112*c*, 112*d* corresponding to each state. Next in the stream of data flow is a shift register 114*a*, 114*b*, 114*c*, 114*d*** for each state having M*x*L bits. M is the number of bits to be decoded in each tracing routine; M*x*L is the number of message bit intervals being examined in each tracing routine. The M*x*L-stage registers are arranged so as to be loaded through a switch position A of switches **116*a*, 116*b*, 116*c*, 116*d*** and to have their contents recirculated at a later time through switch position B.

At the center and left portion of FIG. 10 a separate M-stage trace register **118*a*, 118*b*, 118*c*, 118*d* is provided for each of the four states. Data in the trace registers 118*a*, 118*b*, 118*c*, 11*d* is shifted not only upward and downward to interchange it among the states, but is also shifted leftward by one stage upon each shift pulse. The output of the final stage from each state is returned to the first stage through feedback switches 120** so that the data may recirculate in ring fashion at the same time that it is interchanged among the four trace registers.

The circuit 110 is operated in two phases, a load phase and trace-forward phase. During the load phase the switches **116*a*, 116*b*, 116*c*, 116*d*** on the M*x*L-stage shift registers **114*a*, 114*b*, 114*c*, 114*d* are in the A position and the feedback switches 120 at the top of the circuit diagram are open. M shift pulses are applied to the shift inputs (not shown) of each flip-flop, such as 122, 124, of the trace registers 118*a*, 118*b*, 118*c*, 118*d* and to both the M stage shift registers 112*a*, 112*b*, 112*c*, 122*d*** and the M*x*L-stage shift registers **114*a*, 114*b*, 114*c*, 114*d*. Following each shift pulse of the load phase, the indicated initial conditions are set into the first column of trace flip-flops 126*a*, 126*b*, 126*c*** ≈*d* by means of a preset circuit 128. This action puts a logic 0 in the first stage **126*a* and 126*c* of the trace registers for states 0 and 2, respectively, and places a logic 1 in the first stage 126*b*, 126*d* of states 1 and 3 respectively. When initial conditions are thus shifted into the trace registers 118*a*, 118*b*, 118*c*, 118*d*** the oldest set of M trellis connections is discarded from the M*x*L-stage shift registers **114*a*, 114*b*, 114*c*, 114*d* and information sequences corresponding to these discarded trellis connections are set into the trace-forward registers 118*a*, 118*b*, 118*c*, 118*d***. By the same action, M new trellis connections are inserted in the M*x*L-stage shift registers **114*a*, 114*b*, 114*c* 114*d* and M new trellis connections are placed in the M-stage input shift registers 112*a*, 112*b*, 112*c*, 112*d***.

The switches **116*a*, 116*b*, 116*c*, 116*d*** on the M*x*L-stage registers **114*a*, 114*b*, 114*c*, 114*d* are then placed in the B position and the feedback switches 120** at the top of the diagram are closed. The trace foward phase then begins wherein the trellis connections are circulated through the M*x*L-stage registers **114*a*, 114*b*, 114*c*, 114*d*** by the application of M*x*L successive shift pulses. At the same time, the M bits in the four state registers **118*a*, 118*b*, 118*c*, 118*d*** are circulated L times through the M-stage trace-forward computer. These are the oldest M bits of the four trial messages which still survive. Each entire M-bit sequence is moved at the same time from one state to another state (or perhaps to the same state) so that each bit always remains in the same horizontal row with the bits with which it started.

At the end of the trace-forward phase, which has M*x*L shifts, an M-bit sequence is present in each row of the trace flip-flops, such as flip-flops 122, . . . 124, **126*a***. Some or all of the four M-bit sequences may be identical. For example, all four of the survivor paths may have identical groups through the first M message bit intervals reckoned from the old-data end of the paths, and may not diverge into separate routes until they are near the new-data end of the sequence of bits being analyzed. At the new-data end, the paths always separate, so that every state is occupied by a different trial message.

After the trace-forward phase has been completed, the M-bit sequence which is then stored in the state row corresponding to the most highly correlated path is the decoded message. Data contained in the flip-flops of the most highly correlated state is gated out, providing M bits of decoded final output message for each execution of the search-forward routine just described. The decoded data may be read out either serially or in parallel using conventional additional circuitry not shown in FIG. 10 and comparator 48 of FIG. 6.

Data in all rows **118*a*, 118*b*, 118*c*, 118*d* of the M-stage trace-forward computer will, with high probability, be identical if L is taken to be sufficiently large. Consequently, there is an alternative to selectively reading out the state row of the most highly correlated path. The message sequence may be read out of an arbitrary row 118*a*, 118*b*, 118*c*, 118*d*** of the trace-forward computer in a serial fashion during the next load phase. With high probability, the choice of row would be immaterial because all rows would contain the same sequence of M bits.

At sufficiently low data rates, the MxL-stage shift registers **114*a*, 114*b*, 114*c*, 114*d* and the M-stage shift registers 112*a*, 112*b*, 112*c*, 112*d* of the trace-forward equipment 110 shown in FIG. 10** can be completely eliminated. This is made possible by storing the received data bits in convolutional code form in a circulating type of shift register and computing the trellis connections anew every time. Trellis connection sequences are recomputed as they are needed to accomplish the loading and trace-forward phases of the decoding operation which is described above. Each time the received convolutional code data completes one circulation through the shift register the M oldest branches of the convolutional data are discarded and the M most recently received branches are added.

SIMULTANEOUS COMPUTATION TRACE FORWARD DECODER

Figure 11:
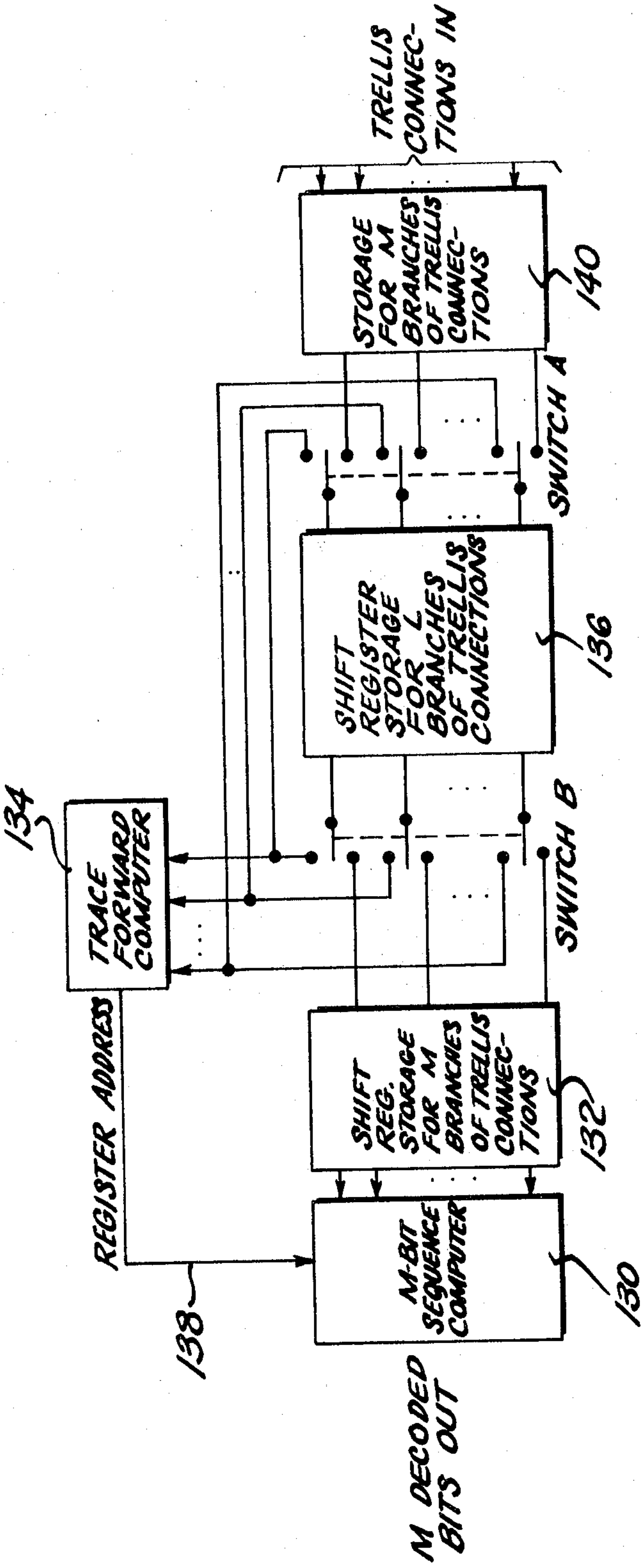
FIG. 11 is a block diagram of another form of the preferred embodiment showing a trace forward technique in which more than one message bit may be decoded if desired during each execution of the data decoding routine; it is faster than the circuit of FIG. 10.

Still another fOrm of the trace-forward decoding tehcnique is shown in the block diagram of FIG. 11. This arrangement permits the $2^{K-1}$ M-bit survivor sequences described above to be computed simultaneously with the execution of the trace forward. Computation of the M-bit survivor sequences is performed by an M-bit sequence computer 130 and a shift register 132. A trace-forward operation is performed by a trace-forward computer 134 and a shift register 136. The data decoding rate is increased in FIG. 11 because the computation and tracing functions are executed simultaneously, at least in part. The M-bit sequence computer 130 of FIG. 11 can be identical with the M-stage trace registers 118a, 118b, 118c, 118d and their logic circuits shown in FIG. 10, but with the feedback switches 120 omitted. Shift register means 132 comprises a separate M-stage shift register for each state. The presetting strobe line 128 of FIG. 10 is included in the M-bit sequence computer 130 of FIG. 11. The shift registers 132 are simply a serial-in/serial-out type having no recycling connections.

When shift pulses are applied to the M-bit sequence computer 130 and register 132 of FIG. 11, the first M bits of trial message sequences are computed as was done in the load phase of the equipment 110 of FIG. 10. One sequence is generated for each state. At the same time that the sequences are being computed, tracing forward can be performed using the trace-forward computer 134 of FIG. 11 which can be identical with the $2^{K-1}$ trace registers 92a, 92b, 92c, 92d shown in FIG. 9. For example, for a constraint length of 3, four 2-bit registers, one register corresponding to each state, are provided for the trace-forward computer with logic circuit interconnections 98 as shown in FIG. 9. The trace registers may be initially loaded with data 00, 01, 10 and 11 to designate the state in binary form as was done in FIG. 9. These initial loadings indicate four states at the old-data end of the data sequence in register 136. The loadings are interchanged in the trace registers in accordance with data received from the shift registers 136 which contains L branches of trellis connection data.

At the end of the shift operation each trace register of the trace-forward computer 134 contains a binary number which serves as a tag to identify the state which was occupied at the old-data end by each numbered survivor path. The state whose cumulative correlation is greatest is then selected by comparator 48 of FIG. 6 as the state containing the sole survivor sequence. The contents of that state's trace register are read out from computer 134 to determine the state, at the old-data end, of the highest correlated path. That state information is utilized through circuit 138 to access the particular sequence in the M-bit sequence computer 130 which should be emitted by computer 130 as M decoded message bits.

A time sequence of operation for the decoding equipment of FIG. 11 begins with switches A and B in a down position. Initially M+L branches of trellis connections are seially shifted in through switch A so that register 132 and register 136 are full of trellis connections.

Switches A and B are then placed in the up position and processing of the data is begun. The $2^{K-1}$ M-bit sequences that are represented by the M branches of trellis connections in register 132 are determined by the M-bit sequence computer 130. There is one of these M-bit sequences in each of the $2^{K-1}$ states and these are stored in registers in the M-bit sequence computer 130 numbered from 0 to $2^{K-1}$-1 corresponding to the state of the sequence.

While this sequence computing operation is being carried out, the contents of register 136 are simultaneously shifted cyclically L times through the trace-forward computer 134. This computer determines how each of the paths transfers among states in passing through the trellis portion represented by register 136. Some of the paths represented at the old-data end may be discarded altogether in passing through the trellis and other paths at the old-data end may be represented in more than one state at the new-data end of the trellis. The cumulative or running correlations of the surviving paths are computed as the paths are traced through the trellis portion. The state register of computer 134 which ends up containing the path with the largest correlation has data identifying the register of the sequence computer 130 whose contents are to be read out as the M-bit decoded message.

Switches A and B are nest placed in the down position and M more trellis connections are shifted in and the operation is repeated. A shift register 140 is provided as a buffer for the trellis connections that arrive during the trace-forward and sequence computation operations.

TRACE BACK DECODER

Figure 12:
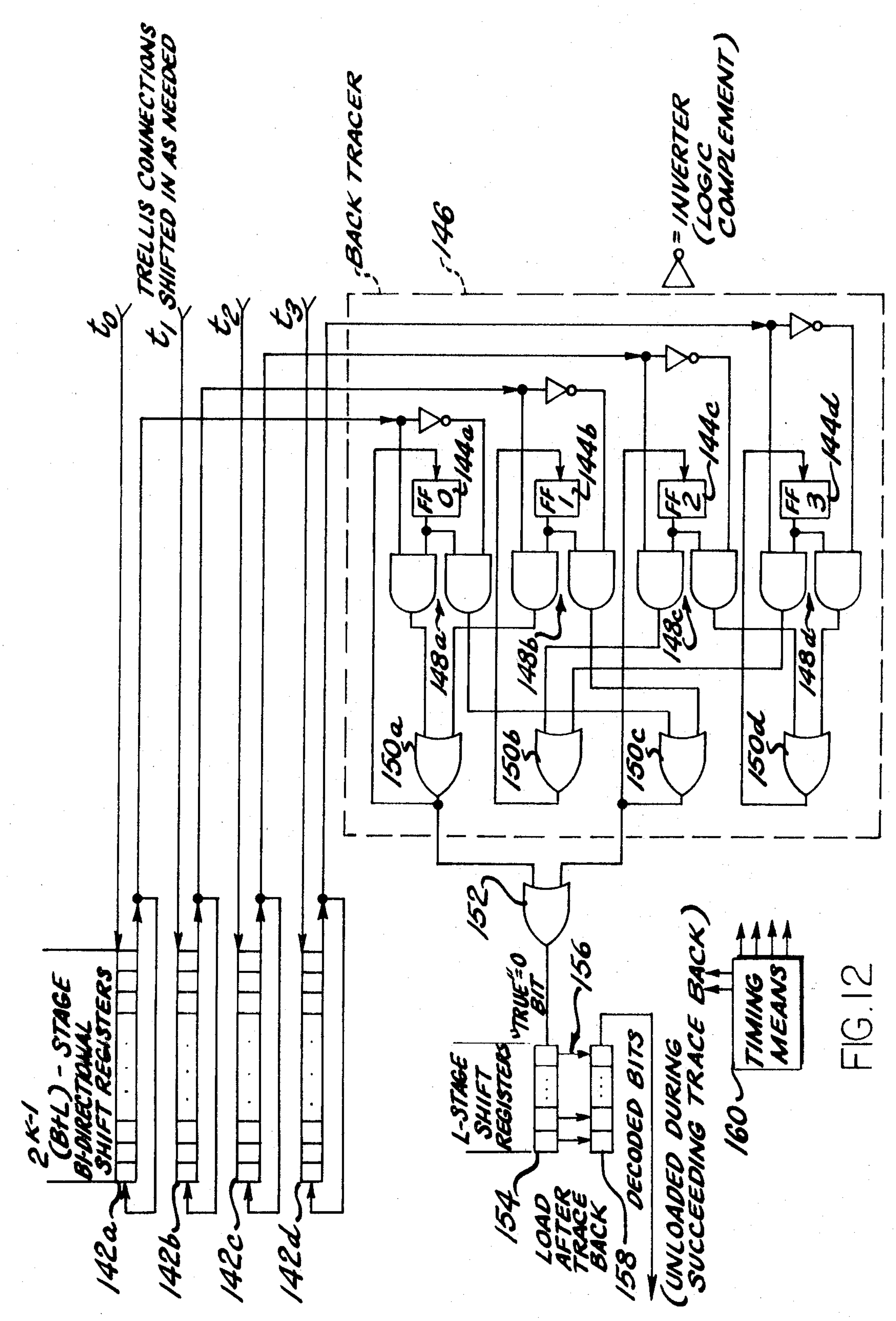
FIG. 12 is a circuit block diagram of still another form of the preferred embodiment for decoding message digits using a trace back technique through the data sequences instead of a trace forward technique.

Still another form of the preferred embodiment traces the survivor paths sequentially through the trellis connection data in a direction from the most recently received data back toward the older data. This form, referred to herein as a trace-back technique, is illustrated in FIG. 12. $2^{K-1}$ shift registers 142*a*, 142*b*, 142*c*, 142*d* are used to store the B+L most recent branches of trellis connections $t_0$, $t_1$, $t_2$, $t_3$ which are shifted into them from the right side during a first phase of the operation. The shift registers 142*a*, 142*b*, *142c, 2l 142d* are capable of being shifted in either direction. When they are full of trellis connections, the insertion of trellis connections iS stopped and the reverse direction of data shift is enabled.

Before any reverse shifting occurs, however, a binary 1 is placed in only one of four flip-flops 144*a*, 144*b*, 144*c*, 144*d* which are part of a back-tracer circuit 146. Each flip-flop corresponds to one state; the flip-flop into which the 1 is loaded corresponds to the state containing the highest correlated path at the new-data end of the sequence under consideration. The other flip-flops are preloaded with binary zeros. The output of each flip-flop 144*a*, 144*b*, 144*c*, 144*d* is connected to a pair of logic AND gates 148*a*, 148*b*, 148*c*, 148*d*, of which only one in each pair is enabled at a time, the choices depending upon the outputs of the B+L stage shift registers 142*a*, 142*b*, 142*c*, 142*d*. Inverters are employed to make the two AND gates of a pair function oppositely. Each pair of AND gates 148*a*, 148*b*, 148*c*, 148*d* corresponds to a two-pole selector switch by which the output of a flip-flop may be selectively directed to one or another of four OR gates 150*a*, 150*b*, 150*c*, 150*d*. One such OR gate is provided for each state with its output connected to the input of the corresponding state flip-flop 144*a*, 144*b*, 144*c*, 144*d*.

In a second phase of the decoding operation, the B+L stage shift registers 142*a*, 142*b*, 142*c*, 142*d* have their data shifted in a direction opposite to that of the loading phase and in a recirculating fashion so that the output data re-enter the shift register at the left end of FIG. 12. As the shifting occurs, trellis connection data appear at the right end of each shift register 142*a*, 142*b*, 142*c*, 142*d* in sequence, the more recently received bits being first. As the shifting proceeds, the logic 1 that w8s loaded into one of the four flip-flops 144*a*, 144*b*, 144*c*, 144*d* interchanges among the flip-flops in accordance with the trellis data. The successive positions of the logic 1 identify the sequence of states encountered in tracing back on the highest cOrrelated path through the code trellis 22 of FIG. 4. If the number of message bits to be decoded in each trace-back operation is L, then the position of the logic 1 is noted during the last L shifts.

Positions of the logic 1 can be interpreted in terms of message bits by means of an OR gate 152 whose two inputs are connected to the outputs of OR gates 150*a*, 150*c* of two of the back-tracer states. The logic 1 is in one of the flip-flops 144*a*, 144*b*, 144*c*, 144*d* corresponding to a state of the sole survivor path in the past. If that state is state 0 or state 2, represented by flip-flops 144*a* and 144*c* respectively, the message bit which put the path into that state was a 0 because those states can be entered only by means of a message bit logic 0. If the logic 1 is in state 1 or state 3, represented by flip-flops 144*b* and 144*d* respectively, the message bit responsible for placing it in that state was a logic 1, as can be seen on the trellis diagram 22 of FIG. 4.

The decoding OR gate 152 transmits a logic signal to the input of an L-stage shift register 154 starting when the first of the oldest L bits is encountered during the back-tracing operation. At the end of the back-tracing operation, the oldest L bits of decoded message are in the L-stage shift register 154, the oldest of those L bits being in a stage at the right-hand end of the L-stage register 154 as drawn in FIG. 12. After the tracking back has been accomplished, the contents of the L-stage register 154 can be transferred by parallel connections 156 to a second L-stage register 158 which can be unloaded during the succeeding trace-back operation by shifting the data out with the oldest message bit coming out first.

In the circuit as shown in FIG. 12, a message bit 1 is decoded as a 0 and a 0 is decoded as a 1. To carry out the decoding routine for a second group of L-bits the direction of shift is once again reversed and L new branches of trellis connections are accepted into the B+L stage shift registers 142*a*, 142*b*, 142*c*, 142*d* from the right side. Thereupon, the oldest L branches come out of the B+L stage shift registers at the left side and are discarded. The direction of shift is reversed and the tracing operation then repeats. Data storage must be provided at the input to buffer the branch data that arrive during the trace-back operation.

The number of shifts that are necessary to decode a bit with this techqnique is B+2L/L because L new branches of connections must be shifted in and then the registers 142*a*, 142*b*, 142*c*, 142*d* shifted cyclically in reverse B+L times for the trace back. By varying L, which is the number of bits decoded upon each trace back routine, one may trade storage size for operating speed. A timing means 160 of routine design, for controllinG the equipment sequence, is indicated in FIG. 12. Timing means are provided in other forms of the invention described herein also.

HIGH-SPEED TRELLIS CONNECTION COMPUTER

Figure 13:
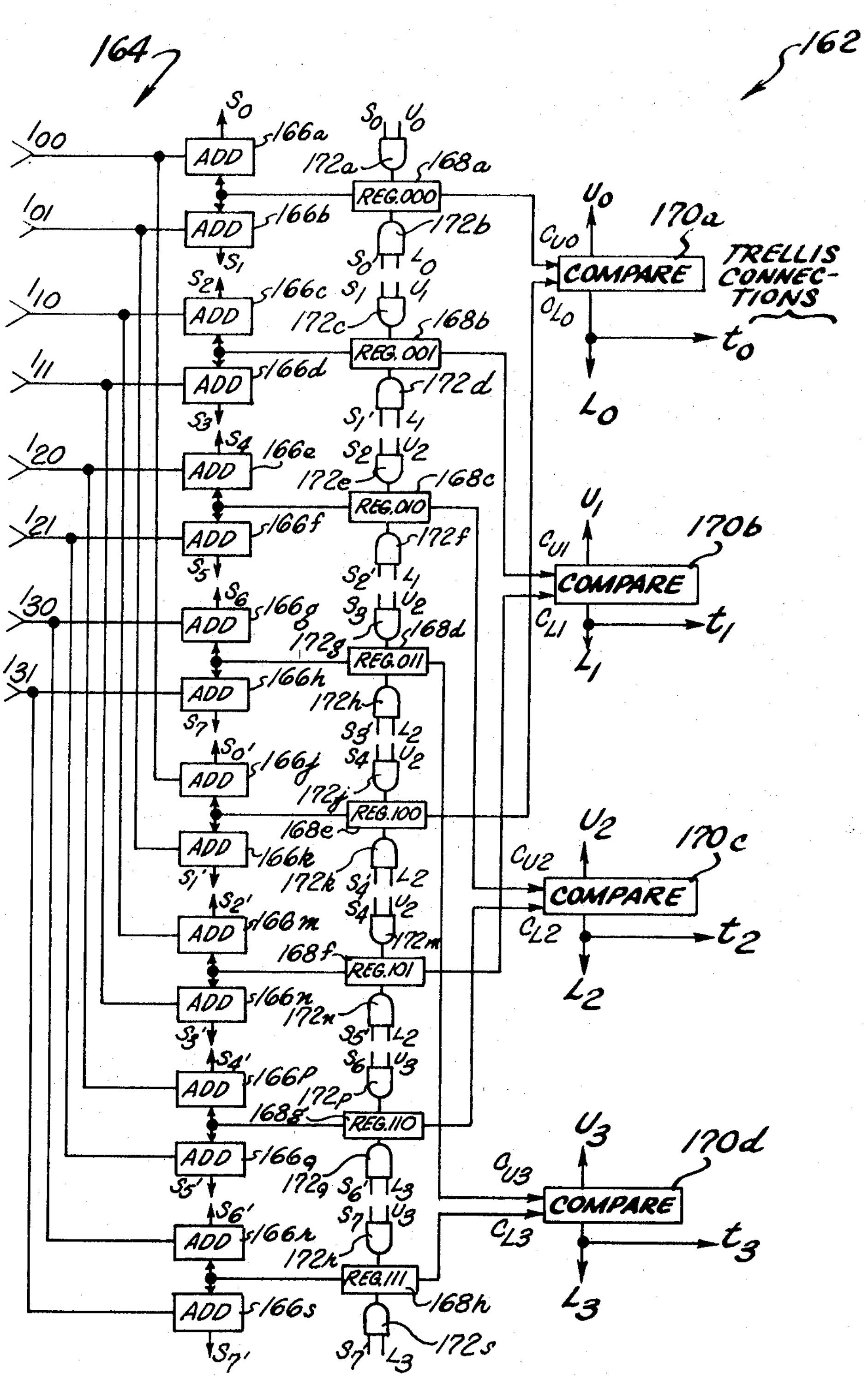

The functions performed by the trellis connection computer shown in FIG. 6 can be performed more rapidly by a different form of trellis connection computer as shown in FIG. 13. The functions of the equipment of FIG. 13 are to up-date the cumulative or running correlations by adding correlation increments to them, to compare cumulative or running correlations for several paths entering each state, to select the higher correlation for each state, and to produce trellis data disclosing which of the possible paths into each state was selected to be the survivor path. It is helpful to refer again to FIG. 6. The trellis connection computer of FIG. 6 requires that certain operations be performed sequentially and within a branch interval, consequently the computation time required may limit the rate of processing information bits. In the trellis connection computer of FIG. 6, the correlation increments $I_{00}$, $I_{01}$, etc., must be added to the cumulative or running correlations stored in registers 44*a*, 44*b*, 44*c*, 44*d*. The outputs of adders 42*a* . . . 42*d* must stabilize, after which the comparators 46*a*, 46*b*, 46*c*, 46*d* can compare in pairs the contents of two adders representing paths entering the same state; the larger of the two correlations is returned from the comparator 46*a*, 46*b*, 46*c*, or 46*d* to a storage register 44*a*, 44*b*, 44*c*, 44*d* respectively as was described above. In the faster form of FIG. 13, the add and compare operations are accomplished simultaneously. The adders operate to compute up-dated correlations corresponding to a branch interval and the comparators at the same time operate upon correlations corresponding to the next older branch interval. Thus, the comparators operate on the data for a branch interval after a delay of one branch interval, which provides time for the adders to settle.

The equipment 162 illustrated in FIG. 13 is for a code having a constraint length of 3. Recently computed corelation increments $I_{00}$ through $I_{31}$ enter at terminals $I_{00}$ through $I_{31}$, also marked 164, at the left side. The first subscript indicates the state and the second subscript indicates the new message bit added to the path in that state. The equipment 162 of FIG. 13 has twice as many adders and twice as many registers for storing cumulative correlations as does the equipment of FIG. 6 because at the time the addition and storage are performed by the method of FIG. 13, it is not yet known which of the two paths entering each state will later be selected as a survivor. Each correlation increment $I_{00}$ through $I_{31}$ is added in two adders 166*a* through 166*s* to a cumulative correlation stored in one of the registers 168*a* through 168*h*, which are further marked 000 through 111. The binary digits by which each register is marked represent the last K message bits of the sequence whose correlation is stored in the register.

At the same time that the adders 166*a* through 166*s* are performing the additions, comparators 170*a*, 170*b*, 170*c*, 170*d* are comparing the cumulative or running correlations for two possible paths entering the corresponding state. The comparators 170*a*, 170*b*, 170*c*, 170*d* are thus comparing correlations for one branch interval at the same time that the adders 166*a* through 166*s* are computing correlations for the next branch interval. If the upper path entering a comparator 170*a*, 170*b*, 170*c* or 170*d* has the larger correlatiOn for the earlier of the two branch intervals, the comparator produces a logic 0 output as trellis connection data $t_0$, $t_1$, $t_2$, $t_3$; if the lower path entering the comparator has the higher value of correlation, the comparator puts out a logic 1 signal as a survivor trellis connection.

Each comparator 170*a*, 170*b*, 170*c*, 170*d* also puts out enabling signals $U_0$, $L_0$, $U_1$, $L_1$, $U_2$, $L_2$, $U_3$ $L_3$ to AND gates 172*a* through 172*s*, which in turn are connected to the storage registers 168*a* through 168*h*. The AND gates 172*a* through 172*s* serve as input multiplexers for the storage registers 168*a* through 168*h* to select an adder 166*a* through 166*s* whose contents are to be transferred into each storage register. The adder containing the higher correlation has its contents transferred into the storage register 168*a* through 168*h*. An appropriate correlation is gated into a register 168*a* through 168*h* from one of two adders 166*a* through 166*s* depending upon which correlation resulted from the survivor path which has now been determined as having survived at the preceding branch. Thus the additions and comparisons are accomplished simultaneously by the equipment 162 of FIG. 13 so that a higher bit rate is obtainable.

TRELLIS CONNECTION COMPUTER FOR LOW DATA RATES

Figure 14:
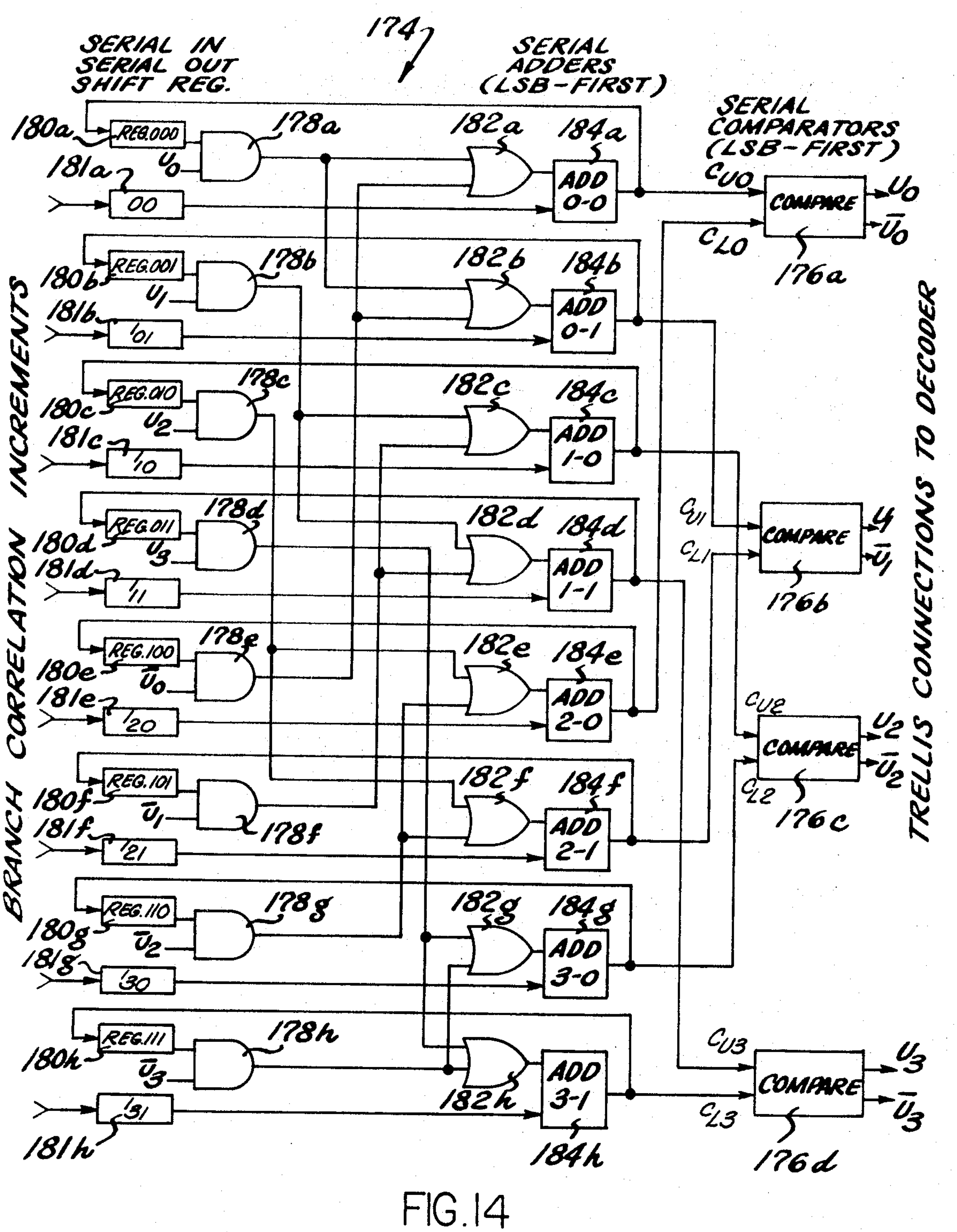

Still anOther form of the trellis connection computer is shown in FIG. 14. This form, illustrated for a convolution code having a constraint length of 3, is suitable for applications where the bit rate is low enough to permit a slower trPllis connection computer. The equipment 174 of FIG. 14 performs additions serially bit-by-bit instead of adding all bits of an addend simultaneously to all bits of an augend. The comparators also operate serially, in this form of the equipment, on the bits of the cumulative or running correlations which they compare.

Four comparators 176*a*, 176*b*, 176*c*, 176*d* are provided, one being for each state. As before, each comparator compares the cumulative or running correlation of an upper path such as $C_{U0}$ entering the state with the cumulative correlation of a lower path such as $C_{L0}$ entering the state. The comparison is performed serially bit-by-bit and at the end, a logic 1 is produced at a U output terminal $U_0$, $U_1$, $U_2$, $U_3$ if the upper path entering the state was found to have the larger correlation; a $\overline{U}$ group of output terminals $\overline{U}_0$, $\overline{U}_1$, $\overline{U}_2$, $\overline{U}_3$ has a logic 1 if the lower path was found to have the larger correlation. The set of U data $U_0$, $U_1$, $U_2$, $U_3$ is put out by the comparators 176*a*, 176*b*, 176*c*, 176*d* as trellis connections for use by other portions of the decoder and the same data are also utilized to selectively enable one or the other of two AND gates, such as gates 178*a*, and 178*e*, to which each comparator's U outputs are connected in the trellis connection computer 174. Each AND gate 178*a* through 178*h* corresponding to a survivor path is enabled and each AND gate 178*a* through 178*h* corresponding to a discarded path is disabled.

Cumulative or running correlations for both the survivor path and the discarded path entering each state were previOusly computed and stored in $2^K$ serial-in/serial-out shift registers 180*a* through 180*h*. Those registers are also marked in binary numerals 000 through 111 representing the data sequence whose correlations they store. In the next following branch interval computation, the data in a register 180*a* through 180*h* corresponding to a survivor path is utilized by adding it to a correlation increment $I_{00}$ through $I_{31}$ for the new branch interval. The data in any register 180*a* through 180*h* corresponding to a discarded path is discarded during the computation preformed in the new branch interval because it is shifted out of the register to a particular AND gate 178*a* through 178*h* which is disabled during that branch interval.

In time sequence of operation of the equipment 174, correlation increments $I_{ij}$ are loaded into the serial-in-serial-out shift registers 181*a* through 181*h*. Each $I_{ij}$ is the correlation increment between the branch data actually received and the possible branch which would be generated when a bit *j* occurs following a data state *i*. The increments may be reduced by a predetermined number for rescale purposes to prevent the registers 180*a* through 180*h* from overflowing. The data in the cumulative or running correlation registers 180*a* through 180*h* are shifted into AND gates 178*a* through 178*h* and thence into OR gates 182*a* through 182*h*, then to a row of serial adders 184*a* through 184*h*. At the same time the data in the correlation increment registers 181*a* through 181*h* are sequentially shifted into the row of serial adders 184*a* through 184*h* for addition to the cumulative or running correlations.

Data from each correlation register 180*a* through 180*h* must pass through OR gates 182*a* through 182*h* into adders 184*a* through 184*h*. In any branch interval only one of the two inputs to each OR gate has data, the other data having been blocked by its preceding AND gate 178*a* through 178*h*. The serial adders 184*a* through 184*h* are also marked "add i-j" because they serially add the survivor correlation of state i to the correlation increment $I_{ij}$ and serially pass the result back to the appropriate cumulative or running correlation register 180*a* through 180*h*. One such register is associated with each adder. At the same time that the outputs of the adders are being fed back to the registers, they are being serially compared by the comparators 176*a*, 176*b*, 176*c*, 176*d*. The least significant bits are operated upon first in both adders and comparators. Cumulative correlations or running correlations are computed for all eight of the message paths in the example of FIG. 14, but four of those correlatiOns are later discarded and the other four, corresponding to survivor paths as determined by the comparators, are later utilized for the next message bit interval.

The forms of the preferred embodiment described in detail in this disclosure are for binary codes but they may readily be generalized by those skilled in the art to other q-ary code systems.

We claim:

1. A decoder for correcting and decoding convolutional data which coalesces into a predetermined plurality of possible states, said data being in branch intervals corresponding to decoded message digits, comprising correlation means having an input to which received convolutional data is applied for computing a correlation between said received data and each of a plurality of possible transmitted sequences of data, trellis data generator communicating with said correlation means for selecting from among said possible transmitted sequences a plurality of survivor sequences having relatively large correlations and establishing data indicating paths of said selected survivor sequences as sequences of transitions between states, comparator means communicating with said correlation means for mutually comparing those of said correlations that correspond to said survivor sequences to select a sole survivor sequence having the greatest correlation, and trace means connected to said trellis data generator means and to said comparator meanS for transforming by code-characteristic rules at least one branch of at least one of said transition sequences into a decoded message digit.

2. A decoder as defined in claim 1 wherein said trace means comprises means for changing by code-characteristic rules at least one of the branches of at least one of said transition sequences into state information, and means for interpreting by code-characteristic rules at least one of the branches of state information of at least said sole survivor sequence into at least one decoded message digit.

3. A decoder as defined in claim 2 wherein said means for changing comprises means for changing at least one of the branches of a plurality of said transition sequences into state information, and said comparator means comprises means for identifying the state information corresponding to said sole survivor sequence.

4. A decoder as defined in claim 3 wherein said means for interpreting comprises means for interpreting at least one of the branches of state information of only said sole survivor sequence.

5. A decoder as defined in claim 2 wherein said means for changing comprises means for changing at least one of the branches of only the transition sequence representing said sole survivor sequence, and said means for interpreting comprises means for interpreting at least one of the branches of said sole survivor sequence into decoded message digits.

6. A decoder as defined in claim 1 wherein said trace means comprises means for transforming one branch of at least one of said transition sequences into a decoded message digit.

7. A decoder as defined in claim 1 wherein at least one of said convolutional code, survivor sequences, and decoded message, is in binary code form.

8. A decoder as defined in claim 1 wherein said trellis data generator means comprises means for selecting from among said possibly transmitted sequences, upon consideration of each received branch, a pluraliy of survivor sequences including one survivor sequence terminating in each state at the newer-data end of each sequence, and wherein said one survivor sequence terminating in each state is one whose correlation is at least as great as the correlation of every other possibly tr8nsmitted sequence terminating in the same state.

9. A decoder as defined in claim 1 wherein said trellis data generator means comprises means for expressing said survivor sequences in a data form which, as to the sequence of states previously occupied by a data sequence, has a different predetermined meaning for a data sequence currently in one state than for a data sequence currently in another state.

10. A decoder as defined in claim 1 wherein said correlation means comprises means for accumulating a sum of incremental correlations of successive branches, said sum indicating the liklihood that a corresponding one of said possibly transmitted sequences is the sequence that was transmitted.

11. A decoder as defined in claim 10 wherein said means fOr accummulating a sum comprises means for maintaining a rescaled cumulative sum, said means for maintaining comprising means for adding a new incremental correlation and deducting a predetermined number upon each branch interval to prevent accumulating register overflow.

12. A decoder as defined in claim 1 wherein said correlation means comprises storage means for storing previous correlations corresponding to previous possibly transmitted sequences of data branches, means for generating correlation modifying data indicating the incremental correlation for a new branch of received data correlated with each of a plurality of possibly transmitted data for the new branch interval, and means for modifying the stored previous correlations in accordance with said modifying data to include therein the effects of the new data branch, upon appending a new message branch to each previous possibly transmitted sequence.

13. A decoder as defined in claim 12 wherein said means for modifying the stored correlation comprises means for maintaining a rescaled cumulative correlation by deducting from the cumulative correlation a predetermined number when overflow of the correlation accumulating registers is imminent.

14. A decoder as defined in claim 12 wherein said means for modifying comprises a plurality of combining elements for combining said previous correlation, upon consideration of an appended data branch, with a plurality of modifying data corresponding to a like plurality of said possible transmitted sequences to produce a like plurality of new correlations corresponding respectively to said possibly transmitted sequences, said combining elements communicating with said trellis data generator to transmit said new correlations thereto for comparison, and said storage means communicating with said trellis data generator to subsequently receive survivor correlation selection information therefrom.

15. A decoder as defined in claim 12 wherein said means for modifying comprises a plurality of combining elements for combining each of a plurality of previous correlations, upon consideration of an appended data branch, with a plurality of modifying data corresponding to a like plurality of possibly transmitted sequences to produce a like plurality of new correlations corresponding to said possibly transmitted sequences, and wherein said means for modifying further comprises multiplex means for selectively gating into said storage means from said combining elements a new correlation to replace each of said previous correlations, said storage means communicating with said trellis data generator means to transmit the correlation contents of said storage meanS thereto for comparison, and said multiplex means communicating with said trellis data generator means to subsequently receive therefrom survivor selection information for said selective gating by said multiplex means.

16. A decoder as defined in claim 12 wherein said storage means comprises a plurality of register means for storing which are serially accessible for writing and reading correlation data; and said means for modifying comPrises a plurality of serially operable combiners each for combining said modifying data in serial fashion with a particular one of a plurality of said previous correlations to produce modified correlation data, selection logic means communicating w6th said storage means and with said combiners and with said trellis data generator means for selecting said particular one in accordance with commands received from the trellis data generator means, said commands being said sequences of transmitions between states evaluated in an immediately preceding branch interval, and means for reloading said storage means with said modified correlation data comprising connection means connecting each of said combiners with one of said register means.

17. A decoder as defined in claim 1 wherein said trace means comprises data register means for storing said sequence of transitions between states, a switchable analog circuit simulating said plurality of survivor sequences as a plurality of signal transmission paths through said states, said analog circuit simulation being switchably established in accordance with said sequences of transitions between states in said data register means, said states being represented topologically by circuit nodes, and wherein said trace means also comprises a signal means propagated through said analog circuit in a trace-back direction, and responsive to said comparator means for tracing said sole survivor sequence into states, and wherein said trace means fur-

UNITED STATES PATENT OFFICE
CERTIFICATE OF CORRECTION

Patent No. 3,789,360 Dated January 29, 1974

Inventor(s) George Cyril Clark, Jr., and Robert Curtis Davis

It is certified that error appears in the above-identified patent and that said Letters Patent are hereby corrected as shown below:

Column 28, line 5, change "least" to --last--.

Signed and sealed this 4th day of June 1974.

(SEAL)
Attest:

EDWARD M.FLETCHER,JR.
Attesting Officer

C. MARSHALL DANN
Commissioner of Patents

[redacted]

UNITED STATES PATENT OFFICE

CERTIFICATE OF CORRECTION

Patent No. 3,789,360 Dated January 29, 1974

Inventor(s) George Cyril Clark, Jr., and Robert Curtis Davis

It is certified that error appears in the above-identified patent and that said Letters Patent are hereby corrected as shown below:

Column 28, line 5, change "least" to --last--.

Signed and sealed this 4th day of June 1974.

(SEAL)
Attest:

EDWARD M.FLETCHER,JR.
Attesting Officer

C. MARSHALL DANN
Commissioner of Patents